United States Patent [19]

Kawai et al.

[11] Patent Number: 4,583,152
[45] Date of Patent: Apr. 15, 1986

[54] HEADLAMP DRIVE AND CONTROL APPARATUS

[75] Inventors: Taneichi Kawai, Anzyo; Masaaki Kato, Anjyo, both of Japan

[73] Assignee: Aisin Seiki Kabushiki Kaisha, Aichi, Japan

[21] Appl. No.: 681,403

[22] Filed: Dec. 13, 1984

[30] Foreign Application Priority Data

Feb. 15, 1984 [JP] Japan ................................. 59-26709
Feb. 23, 1984 [JP] Japan ................................. 59-32924
Feb. 23, 1984 [JP] Japan ................................. 59-32925
Feb. 23, 1984 [JP] Japan ................................. 59-32926
Mar. 5, 1984 [JP] Japan ................................. 59-42494

[51] Int. Cl.⁴ ............................................. B60Q 1/10
[52] U.S. Cl. ..................................... 362/71; 362/286; 362/386; 362/428; 307/10 LS
[58] Field of Search ................. 362/71, 285, 286, 287, 362/386, 428, 802; 318/648; 307/10 LS

[56] References Cited

U.S. PATENT DOCUMENTS

| 3,634,677 | 1/1972 | Seelig | 362/71 |
| 3,700,878 | 10/1972 | Baker | 362/71 |
| 4,186,428 | 1/1980 | Deverrewaere | 362/286 |
| 4,284,903 | 8/1981 | Mutschler et al. | 307/10 LS |
| 4,437,143 | 3/1984 | Hayashi et al. | 362/286 |
| 4,482,939 | 11/1984 | Tishmann | 362/286 |
| 4,486,688 | 12/1984 | Schmitz | 362/71 |

FOREIGN PATENT DOCUMENTS

| EP6569 | 1/1980 | European Pat. Off. | 362/71 |
| 39853 | 3/1980 | Japan | 362/71 |
| 2032648 | 5/1980 | United Kingdom | 362/386 |

Primary Examiner—Magdalen Y. C. Moy
Attorney, Agent, or Firm—Sughrue, Mion, Zinn, Macpeak and Seas

[57] ABSTRACT

A mechanism and an electrical circuit are provided which control an up/down position and a tilt angle of a headlamp on a vehicle. The headlamp is supported by a drive mechanism which includes an electric motor as a drive source. The drive mechanism drives the headlamp to its up or down position, and also controls the tilt angle thereof. In one embodiment, an angle of rotation sensor having improved configurations and disposition of conductor electrodes and contactors is coupled to the sensor. An angle of inclination sensor is mounted on the vehicle. The headlamp is driven in accordance with the outputs from the both sensors so that it illuminates a given point forward of the vehicle. Time limit means is provided, and interrupts the energization of the motor after a given time duration. Retract switch may be operated to drive the headlamp to its up or down position. During such movement, the motor is energized at a high level while it is energized at a low level when controlling the tilt angle. In another embodiment, a second rotary switch is used to select a tilt angle. A headlamp drive mechanism is coupled to a first rotary switch, and the motor is energized through the first and the second rotary switch. The first rotary switch interrupts the circuit connection between the motor and the second rotary switch at a selected tilt angle of the headlamp which is established by the second rotary switch. The second rotary switch has improved combinations of conductor electrodes and contactors.

28 Claims, 19 Drawing Figures

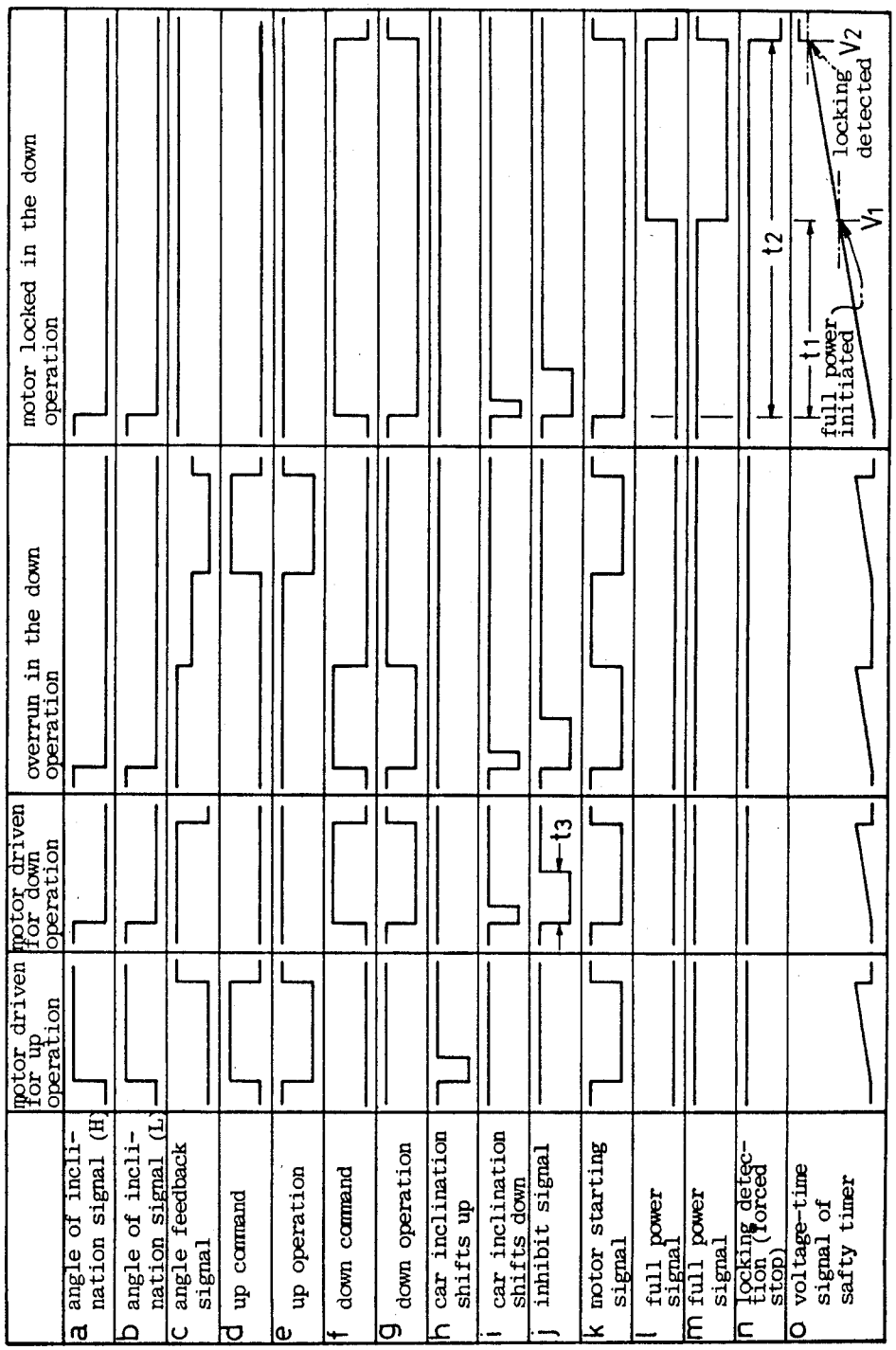

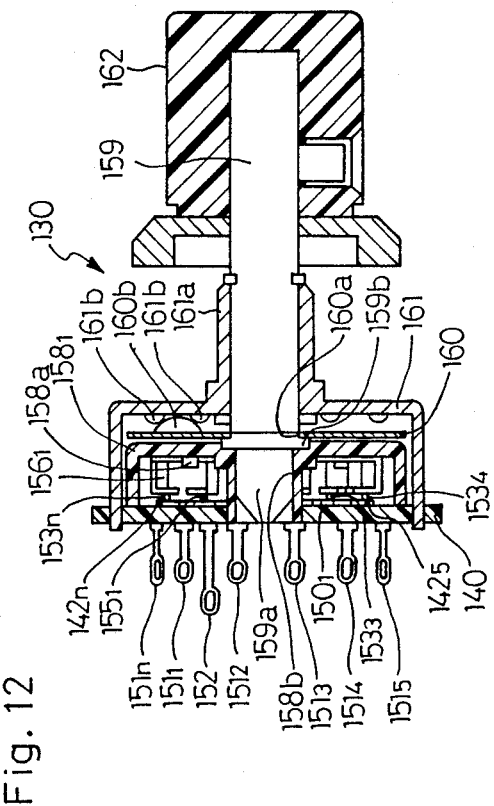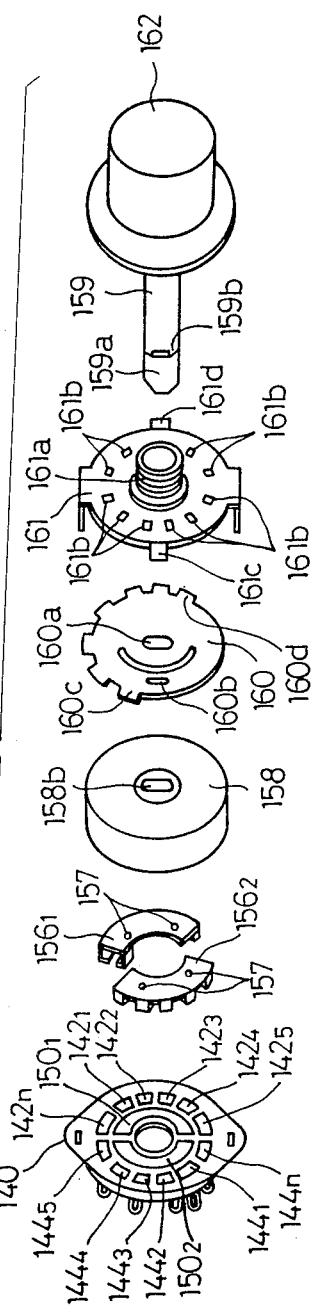
Fig. 12
Fig. 13

HEADLAMP DRIVE AND CONTROL APPARATUS

FIELD OF THE INVENTION

The invention relates to the control of a heading or projection angle of a headlamp, and more particularly, while not intended to be a limitation, to a vehicle headlamp drive and control apparatus which drives a vehicle headlamp to its stowed and its extended position and to control the projection angle of the headlamp in its extended position in accordance with an inclination of the body of the vehicle, and also to such apparatus including a first and a second rotary switch.

BACKGROUND OF THE INVENTION

By way of example, Japanese Laid-Open Patent Application No. 138,043/1981 discloses a system for controlling the projection angle of a vehicle headlamp. In this system, the optical axis of a retractable headlight is controlled automatically by a switch mounted on a shock absorber and which is turned on and off in response to a pressure of a given magnitude. The switch is turned on whenever a mean pressure of the shock absorber exceeds a given value. The mean pressure depends on the elevation of the vehicle or on the inclination of the car body if the switch is mounted on a shock absorber associated with rear wheels. A headlamp is supported by an electric drive mechanism which includes a first brush contact UP for driving the lamp upward, a second brush contact DW for driving it downward, and a third brush contact FM which stops the tilting movement of the lamp at a position which is located slightly below the up position. The projection angle of the lamp can be varied by adjusting the length of the brush contact EM. The switch mentioned above activates a relay driver when it is turned on, thereby controlling the optical axis. It will be seen that the choice of the projection angle is limited to a single value.

French Patent Specification No. 1,592,664 discloses a system including four switches which detect the elevation of the vehicle in several different zones so as to permit the projection angle of the headlamp to be controlled among several values.

It may be concluded that an arrangement of either cited reference represents a lamp drive and control apparatus which includes a lamp angle detector means and a lamp angle command means so that the inclination or the position of the lamp may be controlled in accordance with the status of such means. A brush and a sensor switch mounted on a headlamp tilting mechanism may be selectively connected to energize an electric motor for forward or reverse rotation or to stop it, thus automatically establishing a projection angle of the lamp.

In a retractable headlamp system in which a headlamp may be moved between a stowed position and an extended position, it is preferred that a lamp drive mechanism be provided with a single electric motor which may be used to drive the headlamp between the stowed and the extended position in one instance and to provide a fine adjustment of the angle of the optical axis or the projection angle of the headlamp in its extended position in accordance with the elevation or inclination of the vehicle.

However, when a single motor is used in common, there arises a problem. Specifically, to achieve a retracting movement having an increased stroke, it is desirable that the lamp be rapidly driven from its stowed to its extended position or reversely, thus requiring an increased torque to drive the motor. Conversely, when controlling the projection angle in the extended position of the lamp, the extent of angle control is limited while a higher precision is required. The drive need not be effected at a high rate, and rather it is preferred to drive the motor at a low rate to achieve the required control accuracy while preventing the occurrence of an overrun, for example. Thus a conflict exists between the requirements for the energization of the motor for retracting movement and for the control of the projection angle.

It may appear that such conflicting requirements can be satisfied simultaneously by employing two different values of voltage or current for energizing the motor so that an increased voltage or current may be applied to the motor to develop an increased torque for the retracting movement while a reduced voltage or current may be applied to the motor to develop a low torque for the control of the projection angle. However, there still exists a problem in that in the event of a jamming of a headlamp drive mechanism or an increased load at low temperatures, the low torque developed by the motor may not be sufficient to drive the mechanism effectively, resulting in a locked condition which fails to achieve the desired function.

At any rate, it will be seen that a conventional headlamp drive and control apparatus includes lamp angle detector means and lamp angle command means so that the inclination or position of the headlamp may be controlled in accordance with the status of the both means.

SUMMARY OF THE INVENTION

It is a first object of the invention to provide a lamp drive and control apparatus having improved lamp angle detector means.

It is a second object of the invention to provide a headlamp drive and control apparatus having improved lamp angle command means.

It is a third object of the invention to enable a single electric motor to be used in common for the retracting drive and the control of the projection angle of a headlamp in a manner that a high torque is developed for the retracting movement while a low torque is developed for the control of the projection angle and to prevent the motor from stalling during the low torque drive.

In a first preferred embodiment of the invention, above objects are achieved by a headlamp drive and control apparatus comprising a headlamp drive mechanism including a single electric motor and supporting and driving a headlamp between its stowed and its extended position and for controlling the projection angle thereof in its extended position; an angle of rotation sensor coupled to the headlamp drive mechanism for detecting the angle of tilting of the headlamp; lamp angle command means in the form of an inclination detector mounted on a support member which supports the headlamp drive mechanism, for example, on a car body for detecting the angle of inclination of the car body; projection angle control means for comparing a tilting angle signal from the sensor and a status signal from a status detector to develop a motor energization control signal in accordance with the result of comparison; retract switch means for enabling the motor to be driven at a level which is suitable for developing a high torque for driving the headlamp to its stowed or extended position; time limit means beginning its timing operate at the time the motor is energized and terminating its timing operation when the motor is deenergized, the time limit means producing a high torque signal when the motor continues to be energized for a first preset interval from the initiation of energization thereof and for producing a motor stop signal when the motor continues to be energized for a second preset interval subsequent to the occurrence of the high torque signal; and a motor driver including switching means for switching the energization of the motor between a low torque mode and a high torque mode, the motor driver being operative to energize the motor in its high torque mode in response to the high torque signal from the retract switch means which indicates the energization of the motor in its high torque mode, the motor driver being also operative to energize the motor selectively in its low torque and high torque mode in accordance with a combination of the motor energization control signal and the high torque signal, the motor driver being also operative to deenergize the motor in response to the motor stop signal.

With this arrangement, when the retract switch is operated to provide a command which indicates that the headlamp be driven to its stowed or extended position, the motor is energized in its high torque mode, whereby a retracting movement occurs relatively rapidly to drive the headlamp with a high torque.

In the extended position of the headlamp, the projection angle control means produces a motor energization control signal which causes the motor to be driven in its low torque mode, whereby the projection angle is controlled in accordance with a status such as the inclination or elevation of the car body.

If the low torque drive fails to adjust the projection angle to a desired value because of an increased load on the mechanism, for example, for which a normal operating time interval with the low torque drive is insufficient, the time limit means produces a high torque energization signal, which then changes the motor from its low torque to its high torque mode. When there is an increased load upon the headlamp drive mechanism even though there is no abnormality found with the mechanism, the mechanism is activated by the motor as it is energized in its high torque mode to complete the desired control. In the event of presence of any abnormality in the mechanism, the time limit means subsequently issues a motor stop signal, which then stops the motor.

In a first preferred embodiment of the invention, the time limit means is formed by a timer circuit including timing control switching means which is changed from one of its on/off conditions to the other at the time when a relay which controls the energization of the motor begins to be energized, and which is maintained in its other condition during the time the relay remains energized, an RC time constant circuit the charging and the discharge of which is controlled by the turn-on and -off of the switching means, first comparison means for comparing a charged voltage within the time constant circuit against a reference value and for inverting its output to apply a high torque signal to the motor driver when the charged voltage crosses a first reference value, second comparison means for inverting its output to apply a motor stop signal to the motor driver when the charged voltage crosses a second reference value, and self-holding switching means responsive to the motor stop signal by changing its status to apply a signal to the second comparison means which is effective to maintain the latter in a condition to deliver a motor stop signal. The self-holding switching means reverts to a status in which the self-holding signal is deactivated whenever the power supply is cut off.

With this arrangement, the timer circuit begins its timing operation each time the relay which controls the energization of the motor is energized. When the relay is deenergized, the RC time constant circuit is reset to interrupt the high torque signal. If it is self-holding to maintain the motor stop condition, the self-holding action terminates when the power supply is turned off. Accordingly, when the motor stop condition is self-held as a result of same abnormality, the power supply of the apparatus may be turned off to allow the headlamp drive mechanism to be checked. Subsequently, any abnormality is amended and the power supply is turned on again to terminate the self-holding action for the motor stop condition. A motor drive for controlling the projection angle is subsequently enabled. In this manner, it will be seen that the self-holding action is reset in conjunction with the turn-off of the power supply which may be effected for purpose of inspection or repair.

In a second preferred embodiment of the invention, a lamp angle sensor is formed by a first rotary switch, and lamp angle command means is formed by an improved second rotary switch, and the energization of the motor takes place through the first and the second rotary switch.

Other objects and features of the invention will become apparent from the following description of several preferred embodiments thereof with reference to the drawings.

BRIEF DESCRIPTION OF THE DRAWINGS

FIG. 9 is a timing chart indicating electrical signals appearing at various points in the circuit shown in FIGS. 8a and 8b;

FIG. 12 is a cross section of a second rotary switch which produces a headlamp angle command and which is used in a second embodiment of the invention;

FIG. 13 is an exploded perspective view, to a reduced scale, of the second rotary switch shown in FIG. 13;

DETAILED DESCRIPTION OF PREFERRED EMBODIMENTS

First Embodiment

Figure 1:
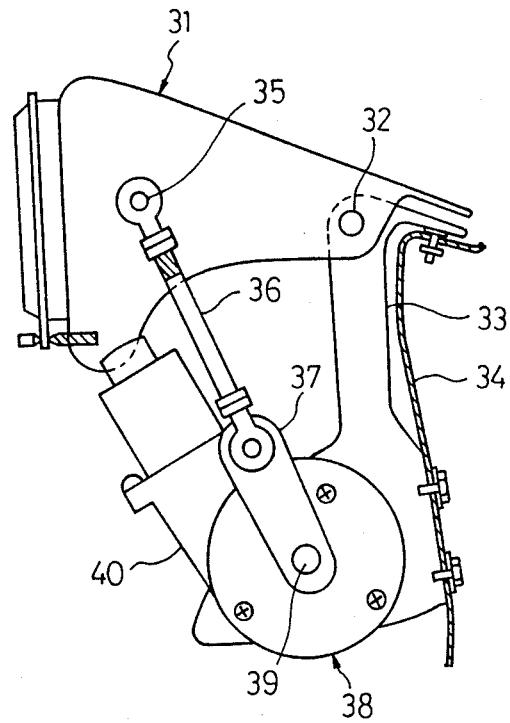
FIG. 1 is a side elevation of a headlamp drive mechanism according to a first preferred embodiment of the invention, illustrating the appearance thereof.

An arrangement and operation of a headlamp drive mechanism will be initially considered. Referring to FIG. 1 which shows the appearance of the headlamp drive mechanism having an angle of rotation sensor 38 coupled thereto, there is shown a headlamp 31 which is disposed on the right-hand of a vehicle and directed forwardly thereof. At its one end, the headlamp 31 is pivotally mounted on a bracket 33 by means of a pin 32, the bracket 33 being secured to a car body 34. A link 36 is pivotally connected to the headlamp 31 by a pin 35, and the other end of the link 36 is pivotally mounted on an arm 37 which is in turn fixedly mounted on a rotary shaft 39 of the sensor 38. The sensor 38 is coupled to a worm, not shown, which is fixedly mounted on the rotary shaft of an electric motor 40.

FIG. 1 shows the headlight 31 at its raised or erected condition or at its top dead center. When the motor 40 rotates under this condition to cause a corresponding rotation of the rotary shaft 39 and the arm 37, the link 36 moves downward, whereby the headlight 31 turns downward about the pin 32 to be stowed (bottom dead center). As the motor 40 then continues to rotate, the headlight then begins its rising movement toward its top dead center.

Figure 2:
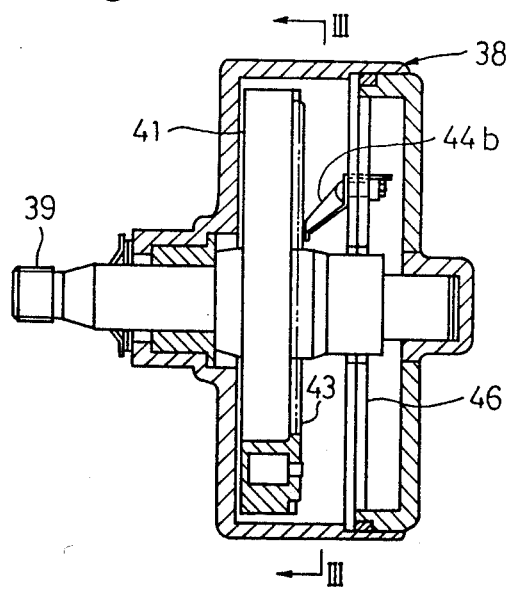
FIG. 2 is a longitudinal section of an angle of rotation sensor shown in FIG. 1.
Figure 3:
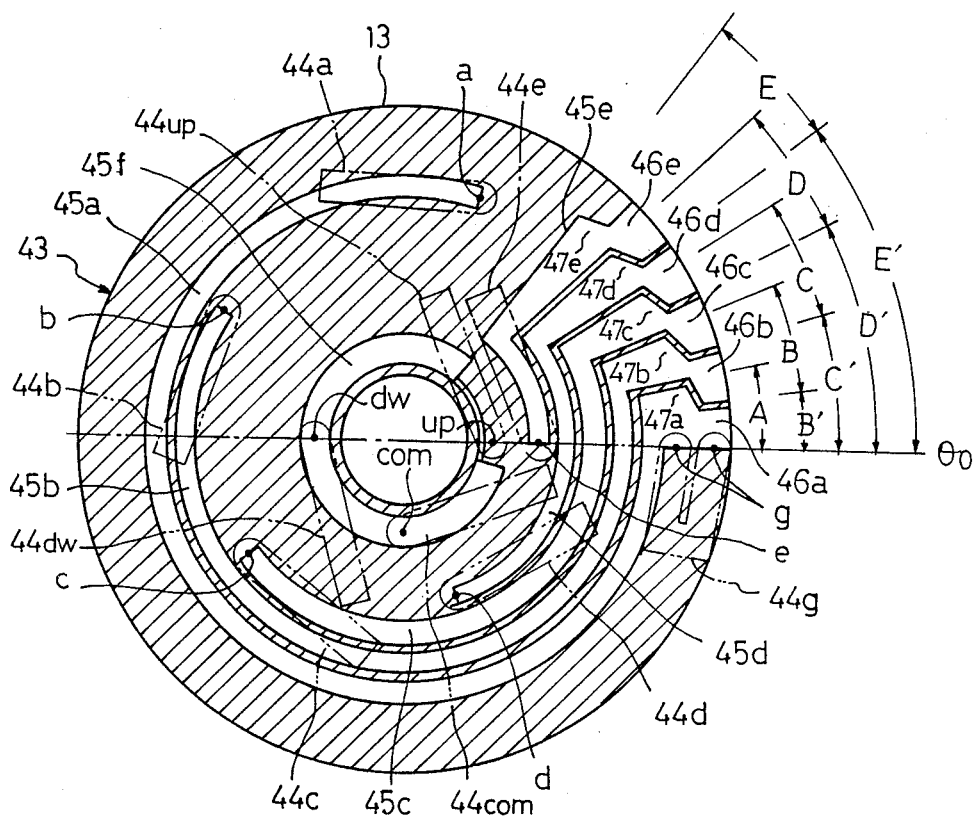
FIG. 3 is a plan view of a printed circuit board of the angle of rotation sensor.

FIG. 2 shows the angle of rotation sensor 38 in longitudinal section, and FIG. 3 shows a printed circuit board or patterned conductor member 43 used in the sensor 38 in plan view. As mentioned previously, the sensor 38 is connected to a worm on the output shaft of the motor 40 and carried a reduction gear or wheel 41 which transmits the rotating drive to the shaft 39. A printed circuit board or a patterned conductor member 43 is fixedly mounted on the wheel 41. An insulated substrate 46 is disposed in opposing relationship with and spaced from the printed circuit board 43. The board 43 carries five separate conductors 45a, 45b, 45c, 45d, 45e as well as another conductor 45f. Each of the conductors 45a to 45e is formed by an arcuate portion which is concentric with the center of the board 43 and a radially extending portion which is continuous with the arcuate portion. To enable the angle to be detected over an increased number of steps, the radially extending portions have configurations and surface distributions such that their radially outward sections 46a to 46e are displaced clockwise while their radially inward sections 47a to 47e are displaced counter-clockwise, as viewed in FIG. 3, so that a single radial line intersects simultaneously with two adjacent conductors, one in its outward section and the other in its inward section. The remaining conductor 45f which is used for an up/down switching operation is annular in configuration, with a single recess formed therein.

While a single contactor 44b is shown in FIG. 2, in actuality, the insulated substrate 46 fixedly carries eight contactors, including contactors 44a to 44e, 44g, an up command contactor 44up, a down command contactor 44dw and a command contactor 44com. The contactors 44a to 44e are secured to the insulated substrate 46 so that their contacts a to e are spaced apart at an interval of 72°, and the arcuate portions are located such that the free end of each of the arcuate portions of the conductors 45a to 45e is alined with each of the contacts a to e when the printed circuit board 13 assumes its reference angular position. Similarly, another conductor 44g is secured to the insulated substrate 46 and carries a pair of contacts g which are aligned with a lateral edge of the conductor 45a.

An up command contactor 44up is secured to the insulated substrate 46 so that its contact up is located in the recess formed in the annular conductor 45f when the printed circuit board 43 assumes its reference position shown in FIG. 3 (relative to the contactors), and a down command contactor 44dw is secured to the insulated substrate 46 so that its contact dw engages the annular conductor 45f at a point which is 180° spaced from the contact up so that the contact dw is located in the recess formed in the annular conductor 45f when the printed circuit board 43 rotates through 180° counterclockwise from the position shown in FIG. 3. Finally, the common contactor 44com is secured to the insulated substrate 46 so that its contact com is normally maintained in contact with the annular conductor 45f over the entire range of rotation of the printed circuit board 43 which is predetermined.

Figure 4:
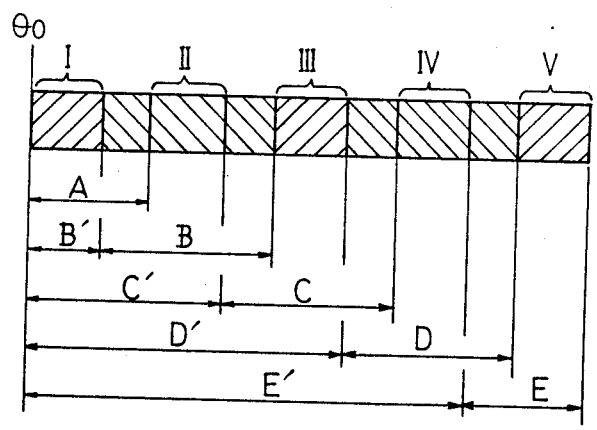
FIG. 4 is a timing diagram indicating the extent of angle of rotation of the sensor as developed into a rectilinear form.

As a result of the described pattern of conductors and disposition of the contactors, the contactors 44a to 44e assume potentials as indicated in Table 1 below as the printed circuit board 13 rotates when the contactors 44g and 44com are connected to the ground potential (L) while a given positive potential (H) is applied to the remaining contactors 44a to 44e, 44up and 44dw through respective resistors. In the Table 1, A to E indicate individual extents of angle or rotation as indicated in FIG. 3, which are referenced to $\theta_0$. These ranges of angle of rotation are graphically plotted against the angle of rotation, as reference to the reference angle of the rotary shaft, in FIG. 4.

TABLE 1

| angle of rotation | potentials of contactors | | | | | angle segment |
|---|---|---|---|---|---|---|
| | 44a | 44b | 44c | 44d | 44e | |
| in B' | H | H | H | H | H | 0-1 |
| from B' to A | L | H | H | H | H | 1 |
| from A to C' | L | L | H | H | H | 1-2 |
| from C' to B | H | L | H | H | H | 2 |
| from B to D' | H | L | L | H | H | 2-3 |
| from D' to C | H | H | L | H | H | 3 |
| from C to E' | H | H | L | L | H | 3-4 |
| from E' to D | H | H | H | L | H | 4 |
| from D to E | H | H | H | L | L | 4-5 |
| | H | H | H. | H | L | 0 |

In a range from the top dead center of the headlamp 31 where it assumes its uppermost position as shown in FIG. 3 to the position where the contact g engages the conductor 45e, the contact up is located within the recess formed in the annular conductor 45f, the contactor 44up is electrically isolated from the conductor 45f to open the switch contact, the contactor 44up assumes its H level and the contactor 44dw assumes its L level. When the headlamp 31 assumes its bottom dead center where it is lowermost and has rotated through 180° from the condition shown in FIG. 3, the contactor 44up assumes its L level while the contactor 44up assumes its H level. For other angles of the headlamp, the both contactors 44up and 44dw assume their L level.

A switching of signals as illustrated in the Table 1 occurs as a result of the contact between the two contacts g of the contactor 44g on one hand and the radially outward sections 46a to 46e and the radially inward sections 47a to 47e of the respective conductors 45a to 45e on the other hand. The contactors 44a to 44e may be maintained in contact with the conductors 45a to 45e, and hence their mounting does not require any high accuracy. Accordingly, it follows that only the contactor 44g be mounted with a high accuracy. In this manner, the design and the assembling operation are enhanced.

Figure 5:
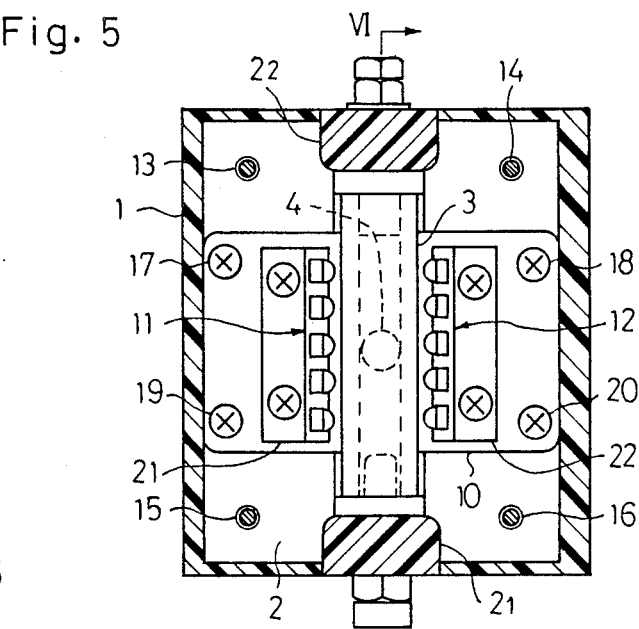
FIG. 5 is a cross section of an inclinometer mounted on a car body in the first embodiment, the cross section being taken through a palne indicated by the line V—V shown in FIG. 7.
Figure 6:
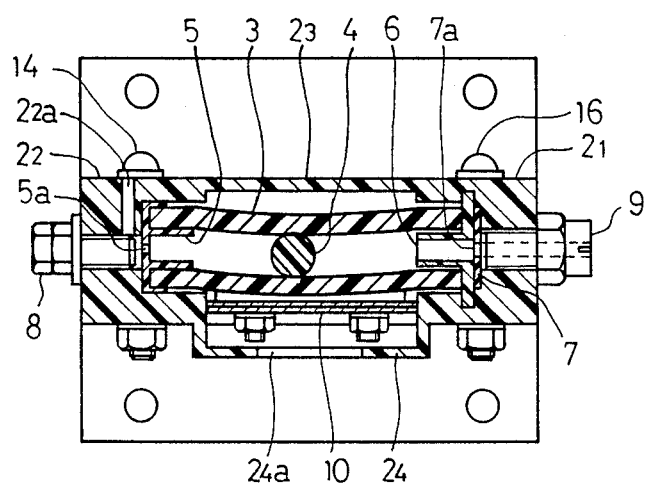
FIG. 6 is a cross section taken along the line VI—VI shown in FIG. 5.
Figure 7:
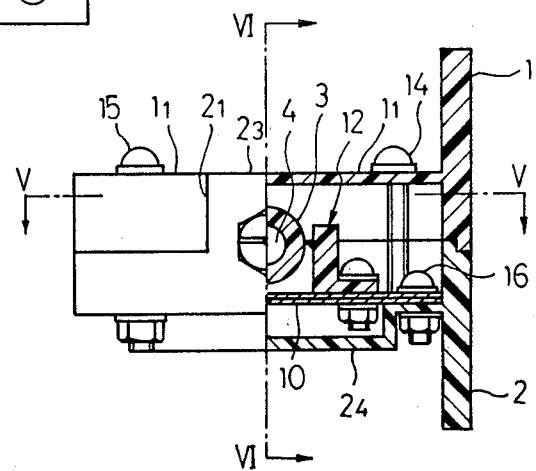
FIG. 7 is a side elevation of the inclinometer, with its right-hand half being shown in section.

The inclinometer mounted on the car body will now be described with reference to FIGS. 5 to 7. FIG. 7 shows the appearance of one-half of the inclinometer in side elevation, FIG. 5 is a cross section taken along the line V—V shown in FIG. 7 (in a horizontal plane) and FIG. 6 is a cross section taken along the line VI—VI shown in FIG. 7 (in front view).

The base of the inclinometer is constructed with a housing cover 1 and a housing base 2. Two opposing sides of the housing base 2 are integrally formed with limbs $2_1$, $2_2$ which support a light transmitting tube. 30. These limbs $2_1$ and $2_2$ are connected together by a top wall $2_3$ which closes a rectangular opening formed between top walls $1_1$, $1_2$ of box-shaped housing cover 1, and by a bottom wall $2_4$ in which an opening $2_4 a$ is formed to permit an access for an electrical cord. The space between the top and the bottom wall $2_3$, $2_4$ is left open to receive a light transmitting tube 3 therebetween.

The light transmitting tube 3 is formed of a synthetic resin material which transmits light, and has a predetermined curved configuration so as to detect an angle of inclination of the vehicle in a range from zero to 3 degrees. The tube 3 internally houses a ball 4 having a diameter which is slightly less than the internal diameter of the tube 3 and which is formed of a synthetic resin material which intercepts light. The left-end of the tube 3 is fitted with a support cap 5 having an orifice 5a centrally formed therein while the right-end of the tube is fitted with a hollow support cap 6. An elastic sheet 7 having an orifice 7a centrally formed therein abuts against the backside of the cap 6. The tube 3 having the caps 5 and 6 and the elastic sheet 7 mounted thereon is mounted in the limbs $2_1$ and $2_2$ so that the lowest point in its curvature is located closest to the bottom wall $2_4$. This condition is illustrated in FIG. 6. As shown in FIG. 6, the limb $2_1$ is formed with a threaded hole at a location which corresponds to the orifice 7a, and a support screw 9 is threadably engaged with the threaded hole, the screw 9 being axially formed with a bore extending therethrough which permits an airstream to pass therethrough. The limb $2_2$ is formed with a threaded bore for adjustment at a location corresponding to the orifice 5a, and a throttle adjusting screw 8 is threadably engaged with this threaded bore. A communication hole $2_2a$ is formed in the limb $2_2$ substantially at the location of the free end of the adjusting screw 8 for providing a communication between the threaded bore and the exterior of the housing. When the adjusting screw 8 is screwed into the bore, the opening of the communication hole $2_2a$ which is left toward the threaded bore is reduced to present a restriction to the degree of communication between the orifice 5a and the communication hole $2_2a$, thus presenting an increased air resistance to the movement of the ball 4. Conversely, when the adjusting screw 8 is partly unscrewed, the degree of communication between the orifice 5a and the communication hole $2_2a$ increases, presenting a reduced air resistance to the movement of the ball 4.

A printed circuit board 10 is secured to the bottom wall $2_4$ which is integral with the housing base 2 by means of set screws 17 to 20. A light source mount 21 and a sensor mount 22 are fixedly mounted on the printed circuit board 10 on the opposite sides of the tube 3. Five light emitting diodes 11 (11a to 11e) are fixedly mounted on the mount 21 along the longitudinal axis of the tube 3 and are connected to electrical conductors on the circuit board 10. Phototransistors 12 (12a to 12e) are fixedly mounted on the sensor mount 22 in opposing relationship with the light emitting diodes 11 (11a to 11e), respectively, with the tube 3 interposed therebetween. These diodes are also connected to electrical conductors on the circuit board 10.

Figure 8A:
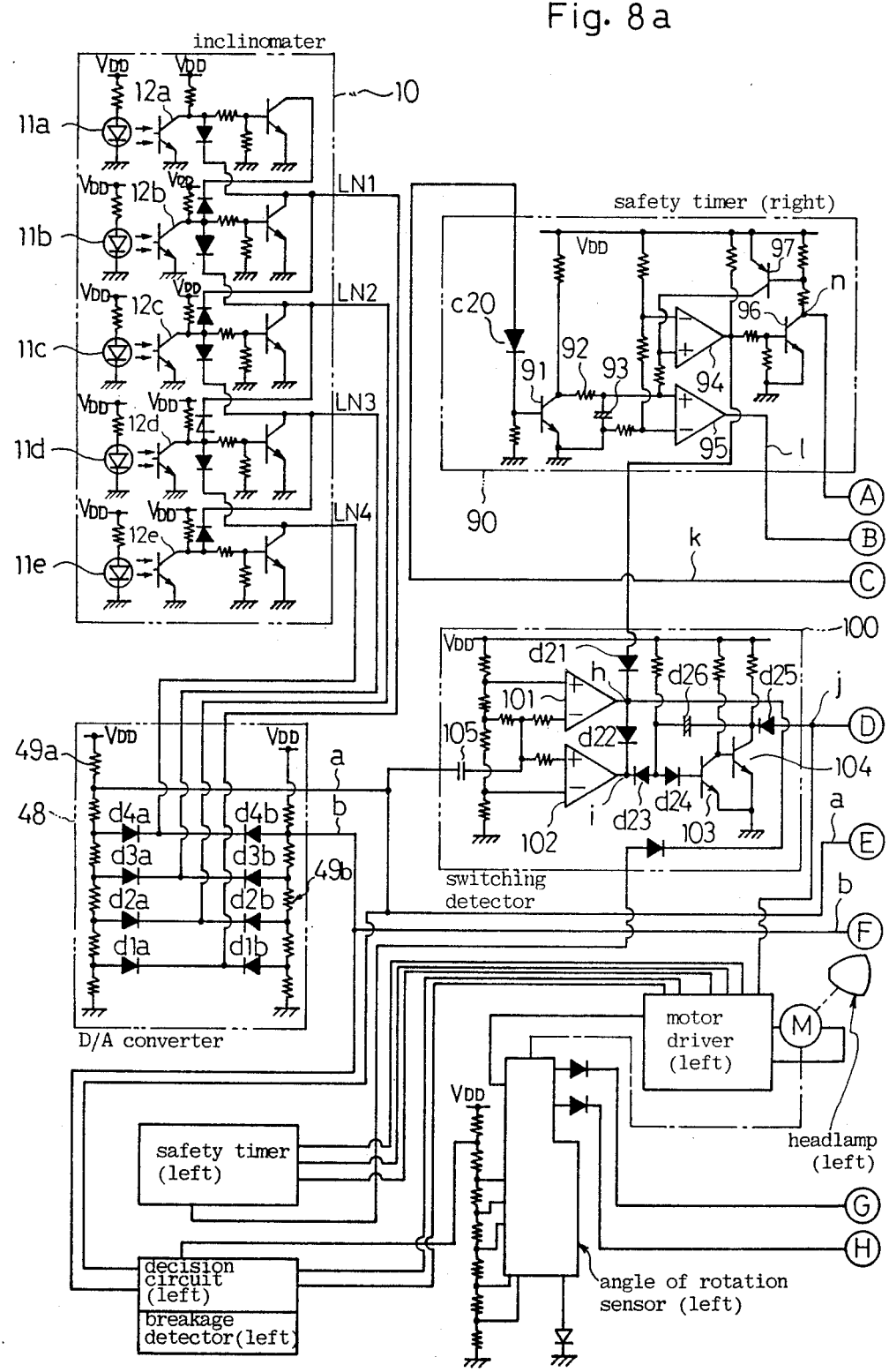
FIGS. 8a and 8b jointly show a circuit diagram of the overall electrical circuit of the first embodiment, FIG. 8a being joined to FIG. 8b at points A to H.

An electrical circuit formed on the printed circuit board 10 including the light emitting diodes 11 and the phototransistors 12 is shown within a box indicated by a phantom line 10 of FIG. 8a. The Table 2 below shows the relationship between the position of the ball 4 and signals appearing on the output lines LN1 to LN4 of the circuit 10.

TABLE 2

| position of ball 4 | outputs | | | | angle-of-inclination segment |
|---|---|---|---|---|---|
| | LN1 | LN2 | LN3 | LN4 | |
| between 11a and 12a | H | H | H | H | 0 |
| between 11b and 12b | L | H | H | H | 1 |
| between 11c and 12c | H | L | H | H | 2 |
| between 11d and 12d | H | H | L | H | 3 |
| between 11e and 12e | H | H | H | L | 4 |

It is to be noted that the ball 4 may be simultaneously detected by two adjacent phototransistors, which are simultaneously shielded from light. In this instance, the phototransistor which has initially detected the ball 4 is turned off to cause its associated output transistor to be turned on, whereby the both output transistors which are located on the opposite sides thereof will receive an L level at their base through diodes. Hence, the output transistor connected to a photoresistor which has detected the ball later is maintained off, and accordingly an L signal appears only on the line connected to the collector of the output transistor which is connected to the initially detecting phototransistor. In other words, when light to two adjacent phototransistors is intercepted, the detection signal appears in response to the phototransistor from which the light is initially intercepted, and there occurs no change in the signals and a detection signal from the later detecting phototransistor does not appear until the initially detecting phototransistor is turned on or receives light.

With the described inclinometer, when the light transmitting tube 3 is disposed horizontally so that its center represents the lowest point in the curvature, the ball 4 will be situated centrally in the tube, whereby the transmission of light between the light emitting diode 11c and the phototransistor 12c will be intercepted. In response to this, an output from the output lines LN1 to LN4 will be that one indicated by an angle segment 2 shown in the Table 2. If the inclinometer is slightly tilted by lowering one end and raising the other end of the tube 3, an output from the output lines will be as indicated in an angle segment 1 of the Table 2. A further inclination results in an output as indicated in an angle segment 0 of the Table 2. Conversely, when the inclinometer is slightly inclined in the opposite direction by raising said one end and lowering the other end of the tube 3, an output from the output lines LN1 to LN4 will be as indicated in an angle segment 3. A further inclination results in an output as indicated in an angle segment 4. The actual values for the angular extent of the respective angle segments 0 to 4 shown in FIG. 2 depend on the curvature of the tube 3. The mobility of the ball 4 is determined by the degree to which the screw 8 is tightened or by the degree of communication for the airstream between the tube 3 and the exterior. Since the movement of the airstream is resisted to an increasing degree as the screw 8 is tightened, there is an increasing resistance to the movement of the ball 4, thus reducing the response of the inclinometer to the oscillation. This means that the rate of response of the inclinometer can be adjusted by means of the screw 8. After the described elements are mounted or secured to the housing base, the cover 1 is assembled with the housing base 2 and are secured together by set screws 13 to 16. It will be seen that the inclinameter described includes no moving contacts and includes detecting elements which are received within the housing, thus facilitating its mounting on the vehicle and providing an enhanced durability. It will also be seen that the angle of inclination can be detected over a number of steps.

Figure 8B:
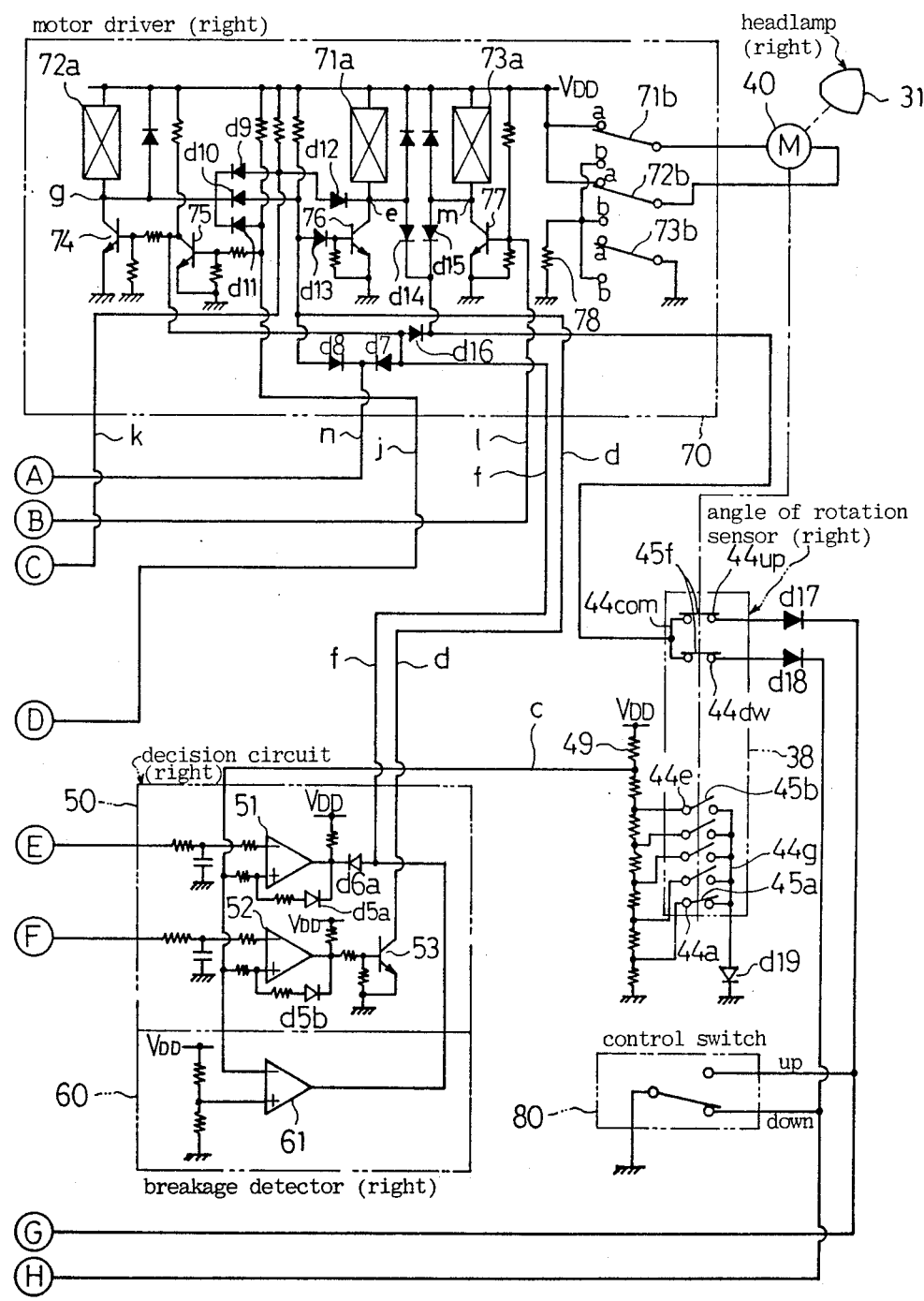

The overall electrical system is shown by FIGS. 8a and 8b, which are joined together as indicated. A block 10 shown in FIG. 8a and enclosed within a phantom line represents the electrical circuit on the printed circuit board 10 including the inclinometer shown in FIGS. 5 to 7, and the block 38 shown in FIG. 8b and similarly enclosed within a phantom line indicates various combinations of conductors and contactors in the form of switches, which represents an angle of rotation sensor.

The signal lines LN1 to LN4 connected to the printed circuit board 10 of the inclinometer are connected to a D/A converter 48. More specifically, the converter 48 includes a first D/A converter section including a string of series resistors 49a and diodes d1a to d4a, and a second D/A converter section including a string of series resistors 49b and diodes d1b to d4b. The resistor string 49a has an output terminal at which a maximum voltage is developed and which is connected to an output line for a first conversion signal a. The resistor string 49a also includes other terminals at which successively lower voltages are developed and which are connected through diodes d4a, d3a, d2a and d1a, respectively, to the output lines LN4, LN3, LN2 and LN1, respectively, of the inclinometer 10. The resistor string 49b in the second converter section has an output terminal at which a maximum voltage is developed and which is connected to an output line for a second conversion signal b. This terminal as well as other terminals of the resistor string 49b at which successively lower voltages are developed are connected through diodes d4b, d3b, d2b and d1b, respectively, to the lines LN4, LN3, LN2 and LN1, respectively, from the inclinometer 10. As a result of described construction, the converter 48 delivers analog signals a and b having voltage levels as indicated in Table 3 below.

TABLE 3

| outputs of inclinometer | | | | output voltage of D/A converter 48 | | angle-of-inclination segment |
|---|---|---|---|---|---|---|
| LN1 | LN2 | LN3 | LN4 | a | b | |
| H | H | H | H | 10 dV | 8 dV | 0 |
| L | H | H | H | 8 dV | 6 dV | 1 |
| H | L | H | H | 6 dV | 4 dV | 2 |
| H | H | L | H | 4 dV | 2 dV | 3 |
| H | H | H | L | 2 dV | 0 | 4 |

It will be noted that the first output signal a is by one voltage step higher than the corresponding level of the second output signal b. The first output signal a is applied to a forward/reverse rotation-stop decision circuit (comparator) 50 and to a switch operations detector 100 while the second output signal b is applied to the decision circuit 50. It is to be noted that the notation "H" and "L" used in the Table 3 correspond to those indicated in the Table 2, and the output L from the circuit 10 shown in FIG. 8a represents the connection to the ground within the circuit 10 while the output H represents the off condition (disconnected from the ground) of the transistor.

Referring to FIG. 8b, it will be seen that the angle of rotation sensor 38 also includes a string of series resistors 49c which are adapted to indicated an output from the sensor 38 in terms of an analog voltage, thus providing an angle signal c in accordance with the rotation of the printed circuit board 43 of the sensor 38. The relationship between the angle of rotation of the sensor 38 and the angle c is indicated in Table 4 below.

TABLE 4

| angle of rotation | potential of contactors 44a to 44e | | | | | angle signal c | angle segment |
|---|---|---|---|---|---|---|---|
| | 44a | 44b | 44c | 44d | 44e | | |
| | H | H | H | H | H | Vdd | 0–1 |
| in B' | L | H | H | H | H | 9 dV | 1 |
| from B' to A | L | L | H | H | H | 7 dV | 1–2 |
| from A to C' | H | L | H | H | H | 7 dV | 2 |
| from C' to B | H | L | L | H | H | 5 dV | 2–3 |
| from B to D' | H | H | L | H | H | 5 dV | 3 |
| from D' to C | H | H | L | L | H | 3 dV | 3–4 |
| from C to E' | H | H | H | L | H | 3 dV | 4 |
| from E' to D | H | H | H | L | L | 1 dV | 4–5 |
| from D to E | H | H | H | H | L | 1 dV | 0 |

It is to be noted that the notation "H" or "L" appearing in the Table 4 corresponds to such notation used in the Table 1. In the circuit of FIG. 8b, the notation "H" represents a switch off condition and the notation "L" a switch on condition. The angle signal c which represents an analog output from the sensor 38 is applied to the decision circuit 10 and to a position feedback sensor breakage detector 60.

Briefly, the comparison circuit 50 comprises a first comparator 51 which compares the first signal a against the angle signal c, a second comparator 52 which compares the second signal b against the angle signal c, a transistor 53 which inverts an output from the comparator 52, diodes d5a, d5b and d6b as well as capacitors and resistors. It develops motor energization control signals f and d in accordance with the interrelationship between the input signals a, b and c as indicated in Table 5 below.

TABLE 5

| relation of input signals | comparator output | | output of circuit 50 | | command |
|---|---|---|---|---|---|
| | 51 | 52 | f | d | |
| a > c, b > c | L | L | L | H | forward rotation |
| a > c, b < c | L | H | L | L | stop |
| a < c, b < c | H | H | H | L | reverse rotation |

In the event the angle signal c assumes Vdd level, indicating that a breakage occurred in the sensor 38 or when the contactor 44g engages none of the conductors 45a to 45e, a comparator 61 in the breakage detector 60 products an L output, which forces the output f to its L level, whereby a command to energize the motor for reverse rotation (for headlamp down) is not issued and accordingly the headlamp is not stowed.

It will be noted that the arrangement of the first embodiment additionally includes a motor driver 70 for energizing the electric motor 40 for forward or reverse rotation or for stopping it in accordance with the outputs f, d from the decision circuit 50, a control switch or retract switch 80 for causing the headlamp 31 to be moved between its stowed and use position, a safety timer circuit 90 and a switching detector 100 which operate to detect any abnormality in the headlamp up/down operation and to provide safeguard actions.

Initially considering the motor driver 70, it includes relay contacts 71b and 72b which are effective to supply voltages to the motor 40 which are appropriate for energizing it for forward or reverse rotation, as well as a full relay contact 73b which is used to switch between a low torque/high torque energization. These relay contacts 71b, 72b and 73b are operated by associated relay coils 71a, 72a and 73a, respectively, and each of the movable contacts is thrown from the position shown where it engages the contact a to the other position where it engages the other contact b when the associated coil is energized. It will be seen that the relay coil 72a will be energized only when the transistor 74 is turned on. The output f from the decision circuit 50 is applied to the base of the transistor 74, and hence this transistor is rendered conductive to energize the coil 72a when f=H. However, the base of the transistor 74 is also connected to the collector of a transistor 75 which is in turn controlled in accordance with an output j from the switch operation detector 100. The transistor 75 will be rendered conductive for j=H, thus establishing an L level at the base of the transistor 74 to turn it off despite the f=H condition. Hence, the transistor 74 cannot be turned on unless the both conditions j=L and f=H are simultaneously established. In other words, the relay coil 72a is energized to throw the relay contact 72b to its associated contact b only when the both conditions j=L and f=H are established. When the transistor 74 is rendered conductive by satisfying these conditions, the base of the transistor 75 is maintained at its L level through a diode d11 and the transistor 74 (self-holding), and hence the transistor 74 is maintained on and the transistor 75 is maintained off if the signal j subsequently changes to its H level. The transistor 74 is turned on when the signal f changes to its L level, when an output n from the safety timer circuit 90, to be described later, changes to its L level, or when a signal fed through a diode d16 to the sensor 38 and the control switch 80 changes to its L level. When the condition j=H is established as the transistor 74 is turned off in this manner or subsequently, the base of the transistor 75 assumes its H level, whereby the transistor 75 is turned on or is reset. Thus, the self-holding action terminates.

When the transistor 74 is conductive and hence the relay contact 72b is thrown to the associated conract b for reverse rotation of the motor, an L level signal is fed through a diode d10 and a diode d13 to the base of the transistor 76, and hence the relay coil 71b cannot be energized, whereby the relay contact 71b remains in its position shown. In one mode, the energization of the relay coil 71a is controlled by the transistor 76. The transistor 76 is turned on to energize the relay coil 71a only when three conditions are satisfied that the output d from the decision circuit 50 is at its H level, the output n from the safety timer circuit 90 is at its H level and the transistor 74 is off. At this time, the relay coil 72a is deenergized, whereby the relay contact 72b assumes its position shown and the relay contact 71b is thrown to the contact b.

In one mode, the energization of the relay coil 73a is controlled by a transistor 77. An output l from the safety timer circuit 90 is applied to the base of the transistor 77, which is turned on to energize the relay coil 73a to throw the relay contact 73c to its contact b whenever l=H. If then one of the relay contacts 71b and 72b is thrown to the contact b and the other is thrown to the contact a; a high current flows through the motor 40, short-circuiting the low torque resistor 78, and thus the motor 40 rotates in its high torque mode. The relay coils 71a and 73a are connected to the angle of rotation sensor 38 and the light control switch 80 through diodes d14 and d15, respectively. The energization of the relay coil 73a occurs when the control switch or retract switch 80 is thrown to its down position and the down command contactor 44dw engages the common contactor 44com through the up/down switching conductor 45f (in other words, the switch 80 issues a down command when the headlamp does not assume its down position). The energization of the relay coil 73a also occurs when the switch 80 is thrown to its up position and the up command contactor 44up engages the common contactor 44com through the up/down switching conductor 45f (in other words, the switch 80 issues an up command when the headlamp does not assume its up position). Upon such energization, the diode d16 forcibly brings the base of the transistor 74 to its L level to prevent the energization of the coil 72a. The relay contact 71b is thrown to the contact b and the relay contact 72b is thrown to the contact a while the relay contact 73b is thrown to the contact b. Thus, the motor 40 rotates forwardly in its high torque mode.

When the motor is energized in accordance with commands from the control switch 80 and the angle of rotation sensor 38, it is enegaized for forward rotation irrespoctive of the up or down command. As mentioned previously in connection with FIG. 1, the headlamp drive mechanism is constructed as a crank mechanism. Hence, if the motor is continuously energized for forward rotation, the arm 37 continues to rotate in the same direction as long as the motor 40 rotates in the forward direction, causing the headlamp 31 to repeat its upward and downward movement. It will be seen that such rotation results in a counter-clockwise rotation of the printed circuit board 43. However, if the switch 80 assumes its down position, when the recess formed in the up/down switching conductor 45f moves into alignment with the location of the contact dw of the down command contactor 44dw (or when the head lamp assumes its stowed position), the down command contactor 44dw moves away from the conductor 45f, whereby the circuit between the diodes d14, d15 and the switch 80 is broken, deenergizing the relay coils 71a and 73a to return the relay contacts 71b and 73b to their positions shown in FIG. 8b, whereby the motor 40 comes to a stop.

If the control switch or retract switch 80 assumes its up position, as the recess formed in the up/down switching conductor 45f moves into alignment with the contact up of the up command contactor 44up (or when the headlamp moves to its retract up position), the up command contactor 44up moves away from the conductor 45f to break the circuit between the diodes d14, d15 and the switch 80 to deenergize the relay coils 71a and 73a, thereby returning the relay contacts 71b and 73b to their positions shown in FIG. 8b, and the motor 40 comes to a stop.

Thus it will be seen that when the switch 80 is changed between its down and its up position, the relay contact 73b is thrown to its contact b, and the motor 40 causes the headlamp to be driven with full power to its stowed position or up position.

It will be seen that the angle signal c has a value of 1 dV, and the inclination signal a=2 to 10 dV and b=0 to 8 dV for the retract up position. Accordingly, the outputs f and d from the circuit 50 commands a forward rotation. Consequently, the relay coil 71a is energized to drive the motor 40 for forward rotation or to rotate the printed circuit board 43 counterclockwise until conditions a>c and b<c (stop) are established, as will be seen from the Table 5. In this manner, the projection angle of the headlamp increases until an angle segment 1 to 4 shown in the Table 4 is reached. Subsequently the motor 40 is energized for forward or reverse rotation depending on the result of comparison between the angle of inclination signals a and b and the actual angle signal c. During the rotation in this range, the recess formed in the up/down switching conductor 45f is located below the contact up of the up command contactor 44up, and hence the contact 45f shown in FIG. 8b (or conductor 45f in FIG. 3) remains open, and since the switch 80 assumes its up position, the cathode of the diode d16 assumes its H level.

It will be seen that the control switch or retract switch 80 is a simple up/down command switch which is brought to its up position when it is desired to bring the headlamp from its stowed position for upward angular movement and which is changed to its down position when it is desired to bring the headlamp from its up position to its stowed position. When the switch 80 is changed to its up position, the headlamp is angularly driven upward from its stowed position until a minimum angle to initiate the control of the projection angle is reached (which corresponds to the retract up position where the conductor 45e engages the contact g). Thereupon, the automatic control is effected in accordance with the outputs f and d from the decision circuit 50 which indicate the relationship between the angle of inclination of the vehicle (signals a and b) and the actual projection angle (signal c). Conversely, when the switch 80 is changed to its down position, the headlamp gets out of the automatic control and moves down angularly until the stowed position is reached, whereupon the motor comes to a stop. When the motor stops, the contactor 44g engages none of the conductors 45a to 45e, and hence the signal c is at Vdd, and the outputs from the decision circuit 50 are such that f=H and d=L, commanding a reverse rotation (see the Table 5). However, an output from the comparator 61 in the position feedback sensor breakage detector 60 assumes its L level to turn the transistor 74 off, which prevents the relay coil 72a from being energized. In other words, after the headlamp has reached its stowed position, the reverse rotation is inhibited subsequently. Since the outputs from the decision circuit 50 are such that f=H and d=L, indicating the reverse rotation, the relay coil 71a cannot be energized. Accordingly, the automatic control function is locked or disabled. The drive of the motor 40 is enabled when the switch 80 is changed to its up position.

Referring to FIG. 8a, the safety timer circuit 90 will now be described. The circuit 90 includes a transistor 91 which is normally on. The potential at the ground side terminal of the relay coil 72a (energized for down operation) and the relay coil 71a (energized for up operation) in the motor driver 70 is transmitted to the base of the transistor 91 through diodes d20, d9 and d12, respectively. In other words, a signal assuming either an L level or an H level, indicating the energization or deenergization, respectively, of the relay coils 72a, 71a, is applied to this base. In response to the L level signal, the transistor 91 is turned off, allowing a capacitor 93 to begin to be charged through a resistor 92. When a time interval $t_1$ passes since the transistor 91 is turned off, a voltage across the capacitor 93 exceeds a reference voltage $V_1$ of a comparator 95, the output of which then changes from its L to its H level, delivering a first timeover signal l of H level which is applied to the base of the transistor 77. This signal indicates that a normal time duration established for the drive has passed. This signal allows the relay coil 73a to be energized, whereby the relay contact 73b is thrown to its contact b to short-circuit the resistor 78. This increases the motor current, and the motor 40 develops an increased output torque. As the transistor 91 continues to be turned off (and the motor 40 continues to be energized for reverse or forward rotation in response to the energization of either relay coil 72a or 71a) and a time interval $t_2$ passes since the transistor 91 has been turned off, a voltage across the capacitor 93 exceeds a reference voltage $V_2$ of a comparator 94, the output of which the changes from its L to its H level, allowing a transistor 96 to be turned on. This transistor then delivers a second timerover signal n of L level which is applied to the cathodes of the diodes d8 and d9. In response thereto, the bases of the transistors 74 and 76 are rendered to be at their L level, deenergizing the relay coils 72a and 71a. As the transistor 96 is turned on, a transistor 97 is also turned on, applying a given holding voltage Vdd to the non-inverting input of the comparator 94. As a consequence, the comparator 94 maintains an output of H level independently from the voltage across the capacitor 93, thus maintaining the transistor 96 on. In this manner, a self-holding action is achieved. This self-holding action disables the automatic control in accordance with outputs from the decision circuit 50 while permitting the forward rotation of the motor to drive the headlamp to the top dead center (retract up position) or the bottom dead center (stowed position) in accordance with the up or down position of the switch 80.

It will be seen that as a result of the described operation of the safety timer circuit 90, it is assured that when the energization of the motor continues over the preset duration $t_1$, the relay coil 73a is energized to allow a high torque current to flow through the motor 40, thereby driving the arm 37 for rotation with an increased force. In this manner, it is assured that the headlamp be driven in an intended manner despite any increase in the required drive to the headlamp as a result of rattling of the mechanism or mechanical abrasion. When the motor continues to be energized over a preset duration $t_2$, the relay coils 72a, 71a are deenergized to stop the motor. This prevents the continued energization of the motor when the mechanism is locked. If the power supply is interrupted, the transistors 96, 97 are turned off, and when the power supply is reclosed, the safety timer circuit 90 becomes reset. If the power supply is maintained, a change in the angle of inclination detection signal a by one step either upward or downward results in the signal h or i changing to its L level. This turns the transistor 96 off and turns the transistor 97 off, whereby the safety timer circuit 90 is reset, allowing the motor to be energized in accordance with the outputs f, d from the circuit 50 for controlling the projection angle.

The reason that the drive with a low torque and a high torque is permitted is firstly because it is desired to accelerate the drive of the headlamp to its up position or stowed position, secondly because it is desired to drive the headlamp at a low rate during the automatic control of the projection angle in accordance with the angle of inclination of the car body so that the stability of the control and the accuracy of the position reached are attained, and thirdly because it is desired that the headlamp can be driven with high torque to move it up and down automatically even if there is a change in the magnitude of the drive torque required with time as a result of abrasion, deformation or contamination of the mechanism.

Referring to FIG. 8a, the switching detector 100 will now be described. The detector 100 includes a capacitor 105 which receives the angle of inclination signal a. When the signal a remains constant and does not vary, the capacitor 105 is charged by a difference between the signal a and a constant voltage which is applied to the inverting input of a comparator 101 (and to a non-inverting input of a comparator 102). At this time, outputs h and i from the comparators 101 and 102, respectively, assume H level. If the angle of inclination signal a rises, there is a charging current to the capacitor 105, and the voltage supplied to the inverting input of the comparator 102 will increase as long as there is such current flow, and the output i from the comparator 102 remains at its H level. However, the output h from the comparator 101 inverts to its L level. When the capacitor 105 ceases to be charged, the output of the comparator 101 reverts to its H level. Conversely, when the angle of inclination signal a declines, the capacitor 105 discharges through the series resistor 49a, and the output of the comparator 101 remains at its H level as long as the discharge occurs, but the output i from the comparator 102 inverts to its L level. When the capacitor 105 ceases to discharge, the output i from the comparator 102 reverts to its H level. In other words, the comparator 105 is utilized to operate as a differentiator, the comparator 101 is utilized as a decision circuit which determines a rise in the angle of inclination signal a, and the comparator 102 is utilized as a decision circuit which determines a decline in the signal a.

When the output h from the comparator 101 changes to its L level (or when the angle of inclination signal a rises), the base of the transistor 96 in the safety timer circuit 90 assumes an L level, and this transistor remains off. If the safety timer circuit 90 has stopped the motor and is self-holding with its transistor 96 on when the duration $t_2$ passes for reason of some abnormality, the signal h=L turns the transistor 96 off, whereby the transistor 97 is also turned off, interrupting the lock voltage to the non-inverting input of the comparator 94 which causes the comparator 94 to maintain its H level output. In other words, if the safety timer circuit 90 is self-holding because of abnormality, the signal h=L terminates the self-holding action. At this time, the comparator 52 in the decision circuit 50 produces an output of L level as a result of a rise in the signal a, whereby the outputs f and d from the circuit 50 assume L and H levels, respectively, allowing the relay coil 71a to be energized to thereby allow the motor 40 to be energized for forward rotation in order to drive the headlamp upward. When the headlamp is driven upward in response to such forward rotation of the motor, the angle of rotation signal c rises, whereby the output from the comparator 52 changes to its H level, causing the outputs f and d from the circuit 50 to change to their L levels, thus deenergizing the motor 40.

When the output i from the comparator 102 changes to its L level or the angle of inclination signal a declines, the output of the comparator 101 similarly assumes an L level, whereby the base of the transistor 96 in the safety timer circuit 90 assumes an L level and the transistor 96 remains off. In the event the transistor 96 is turned on (as a result of abnormality stop and a self-holding action), the self-holding action is terminated as mentioned previously. The signal i=L turns a transistor 103 off, which in turn allows a transistor 104 to be turned on, allowing a capacitor d26 to begin to be charged. An output j assumes an L level for a time interval $t_3$ until the capacitor d26 is charged to a given voltage. When the output j assumes an L level, the anode of the diode d11 and the base of the transistor 75 in the motor driver 70 assume an L level, whereby the transistor 75 is turned off. This enables the transistor 74 to be turned on in response to an output f=H from the circuit 50. Stated differently, the signal j=H for the time interval $t_3$ since the angle of inclination signal a has declined represents a requisite to turn the transistor 74 on. The transistor 74 cannot be turned on except for the time interval $t_3$. When the angle of inclination signal a declines, the output of the comparator 51 in the decision circuit 50 changes from its L to its H level, whereby the transistor 74 is turned on to energize the relay coil 72a, thus energizing the motor 40 for reverse rotation. As the transistor 74 is turned on, the base of the transistor 75 is connected to the ground through the diode d11 and the transistor 74, whereby the transistor 75 is maintained off. In other words, when the transistor 74 is turned on with the signal j=L, an L level is applied to the base of the transistor 75 by the self-holding action if the signal j reverts to its H level. The reverse rotation of the motor causes a change in the signal from the angle of rotation sensor 38 to reduce the output voltage c from the series resistor 49c, which is effective to cause the output of the comparator 51 to revert to its L level, whereby the transistor 74 is turned off to deenergize the relay coil 72a, thus stopping the motor 40. As the transistor 74 is turned off, the anode of the diode d11 and the base of the transistor 75 assume the level of the signal j, whereby the self-holding action terminates.

As described, the switching detector 100 merely resets the safety timer circuit 90 when the angle of inclination signal a rises, indicating the necessity to drive the headlamp upward, but if the signal a declines, indicating the necessity to drive the headlamp downward, it operates to not only reset the safety timer circuit 90, but also enables the transistor 74 to be turned on only during the time j=L (or the time interval $t_3$). The motor cannot be energized for reverse rotation unless the condition f=H prevails during the time j=L is established.

As a result of the described operation, whenever the switch 80 assumes its up position, the axis of projection for the headlamp 31 is automatically driven downward if the inclination of the car body changes downward, and the axis of projection for the headlamp 31 is automatically moved upward if the inclination of the car body changes downward. In this manner, the projection angle of the headlamp 31 is established so as to reach a coincidence between the output from the inclinometer 10 and the output of the angle of rotation sensor 38.

When the switch 80 is changed to its down position, the headlamp 31 is driven downward to its stowed position where it comes to a stop. When the switch 80 is changed to its up position when the headlamp is in its stowed position, the headlamp 31 is initially raised to a minimum projection angle which is used during the nighttime running to illuminate forward of the car body, and then a projection angle is established in accordance with the output of the inclinometer 10.

It will be appreciated that the described headlamp drive mechanism is also provided for the left headlamp assembly. The left headlamp drive mechanism includes a separate angle of rotation sensor. Another set of motor driver which energizes the left headlamp drive mechanism, forward/reverse rotation-stop decision circuit, position feedback sensor breakage detector and safety timer circuit is provided. The control switch 80, the inclinometer 10, the D/A converter 48 and the switching detector 100 are used in common for both right and left headlamp assemblies.

FIG. 9 shows various signals appearing at selected points in the electrical circuit of FIGS. 8a and 8b when the projection angle of the headlamp is automatically controlled in accordance with the relationship between the signals a and b of the inclinometer 10 and the detection signal c from the angle of rotation sensor 38 so as to achieve a coincidence therebetween. The alphabetical letters indicated left-most in the chart of FIG. 9 indicate the corresponding signals shown in FIGS. 8a and 8b. A second column, as counted from the left, show these signals which occur when the angle of inclination of the car body increases downward and the magnitude of the signals a and b increases. A third column, as counted from the left, show these signals when the angle of inclination of the car body decreases or the inclination of the car body shifts upward to reduce the magnitude of the signals a and b. Similarly, a fourth column indicates these signals when the angle of inclination of the car body decreases and the magnitude of the signals a and b decreases and the motor 40 is energized for reverse rotation, resulting in an overrun, which is compensated for by the forward rotation of the motor. A fifth or right-most column shows these signals when the angle of inclination of the car body decreases as does the magnitude of the signals a and b and the motor 40 is energized for reverse rotation, but fails to move the headlamp down within a given time interval.

In the first embodiment described above, the single electric motor is used in common for the retracting movement of the headlamp and the automatic control of the projection angle, thus simplifying the arrangement of the headlamp drive mechanism. To reiterate, the motor is energized in its high torque mode for performing the retracting movement while it is energized in its low torque mode to perform the automatic control of the projection angle, thus simultaneously satisfying the drive requirements for both the retracting movement and the automatic control of the projection angle. In addition, if the motor does not cease to be energized in its low torque mode within a given time interval, it is then energized in its high torque mode. When a given time interval is exceeded during which the motor is energized in its high torque mode, the motor is deenergized. In this manner, the automatic control of the projection angle takes place if a load upon the headlamp drive mechanism increases. In the event of presence of any abnormality that foreign matters may be present within the mechanism, the motor is automatically stopped, thus providing a safeguard for the mechanism and the motor.

Figure 10:
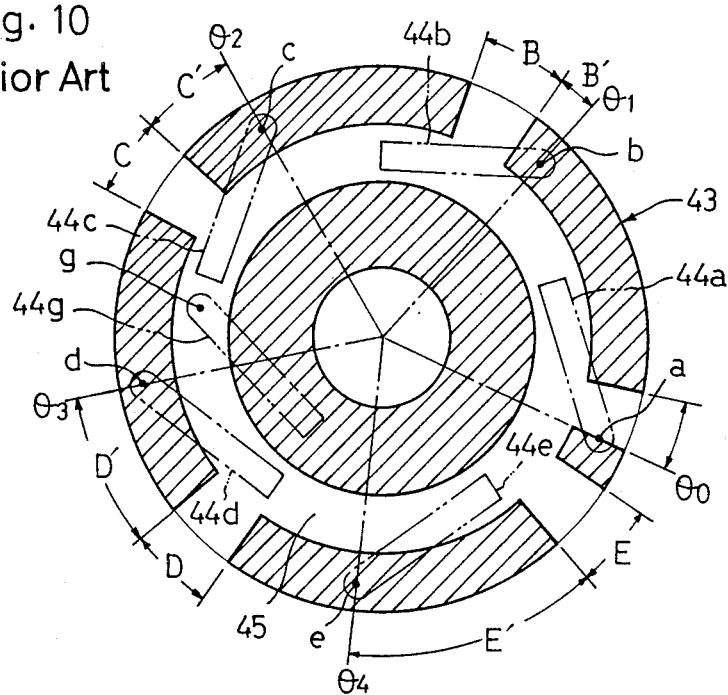
FIG. 10 is a plan view of a printed circuit board used in a conventional lamp angle sensor.

The surface of the printed circuit board 43 for an angle of rotation sensor used in the prior art is illustrated in FIG. 10. A printed conductor 45 is formed on the circuit board 43. It is to be noted that the hatched areas in FIG. 10 represent the surface of an insulator used in the circuit board. Six contactors 44a to 44e and 44g are secured to an insulating substrate, not shown, and have respective contacts a to e and g which are spaced apart by an angular interval of 360°/5=72°, as shown in FIG. 10. The six contactors 44a to 44e and 44g are located opposite to the printed circuit board 43, and the contacts a to e and g are located as shown in FIG. 10 relative to the printed circuit board 43. In a conventional angle of rotation sensor 38 which uses such printed circuit board, the contactor 44g is maintained in contact with the printed conductor 45 while the remaining contactors 44a to 44e engage radial extensions from the printed conductor 45 only at particular angles of rotation of the printed circuit board 43. With such sensor, the output signals are determined by the positional relationship between the conductor pattern on the printed circuit board 43 and the contactors as well as the angle of rotation. Accordingly, if the conductor pattern or the contactors are offset in position, the sensor fails to provide an output signal relative to the angle of rotation as intended, resulting in an error output therefrom. In a conventional angle of rotation sensor described above, it will be seen that there are five radial extensions from the printed conductor 45 which are associated with the contacts a to e on the contactors 44a to 44e which are spaced apart at an interval of 72°, and combinations of these extensions and associated contacts determine the output signal. However, each of the contactors 44a to 44e may involve an error in design or assembly, requiring a high mounting accuracy for all of the five contactors.

By contrast, in the angle of rotation sensor 38 used in the first embodiment, there are provided a plurality of conductors which are separate from each other to define an overall pattern, and each of these conductors includes an arcuate portion centered about the rotary shaft and a radial portion which continues from the associated arcuate portion. The radial portions of the respective conductors are disposed adjacent to each other. On the other hand, there are provided two sets of conductors. A first set of conductors are adapted to engage the arcuate portions of the respective conductors while a second set of conductors are adapted to engage the radial portions successively as the sensor rotates. This brings forth an advantage that only one or two contactors require a high precision for its mounting. In addition, each radial portion includes a radially outward section which extends in one direction circumferentially and a radially inward portion which extends in the opposite direction circumferentially, thus defining a staggered configuration. The second set of contactors include two contactors, one of which engages the radially outward section of the radial portion of a selected conductor and the other of which engages the radially inward section of the radial portion of adjacent conductor simultaneously. In this manner, there is obtained an increased number of steps over which the angle of rotation can be detected.

Figure 11:
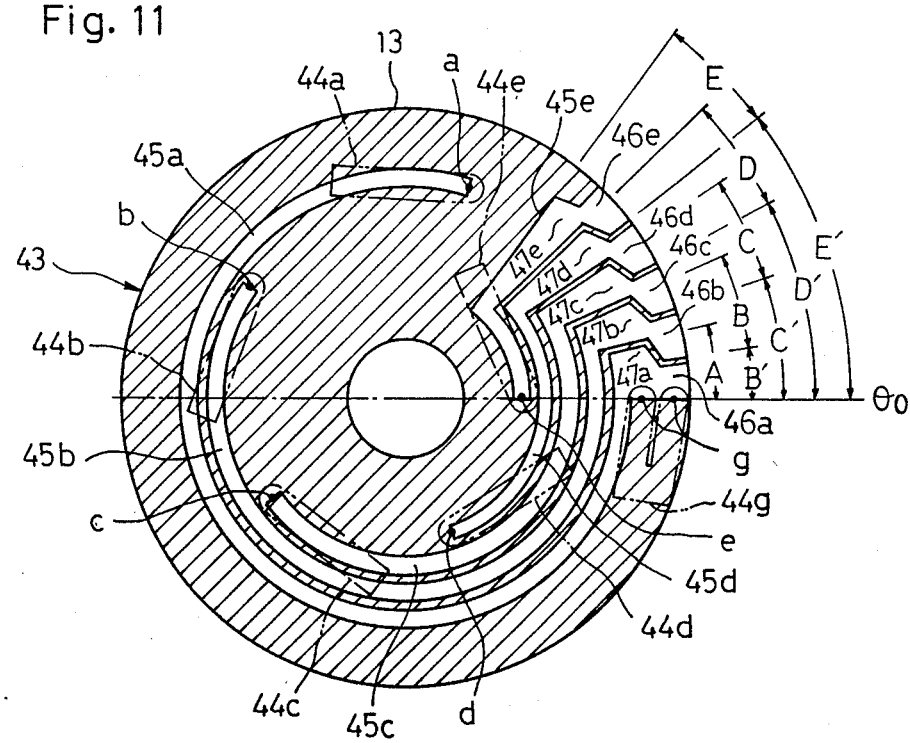
FIG. 11 is a plan view of a printed circuit board which may be used in a modification of the lamp angle sensor of the first embodiment.

In addition, the angle of rotation sensor 38 according to the first embodiment includes the up/down switching conductor 45$f$ formed on the printed circuit board 43, and also includes the up command contactor 44$up$, the down command contactor 44$dw$ and the common contactor 44$com$, all mounted on the insulated substrate 46. These conductors and contactors are connected to the retract switch 80 and the motor driver 70 in the manner illustrated in FIG. 8$b$, defining specific zones for the energization of the motor during the retracting movement. This dispenses with the provision of a separate stowed position sensor and a retract up position sensor which might otherwise be needed to be mounted on the motor driver mechanism.

Where it is desired to employ a manner of operation in which a stowed position sensor and a retract up position sensor are mounted on the motor drive mechanism to feed signals which are used in controlling the energization of the motor, or to employ a manner of operation in which the headlamp is not driven to its stowed position, but only the projection angle is controlled within a given range when the headlamp assumes its up position, the conductor 45$f$ may be removed from the printed circuit board 43 and the contactors 44$up$, 44$dw$ and 44$com$ may be removed from the insulated substrate 46 (see FIG. 2), as indicated in FIG. 11.

Second Embodiment

Figure 18:
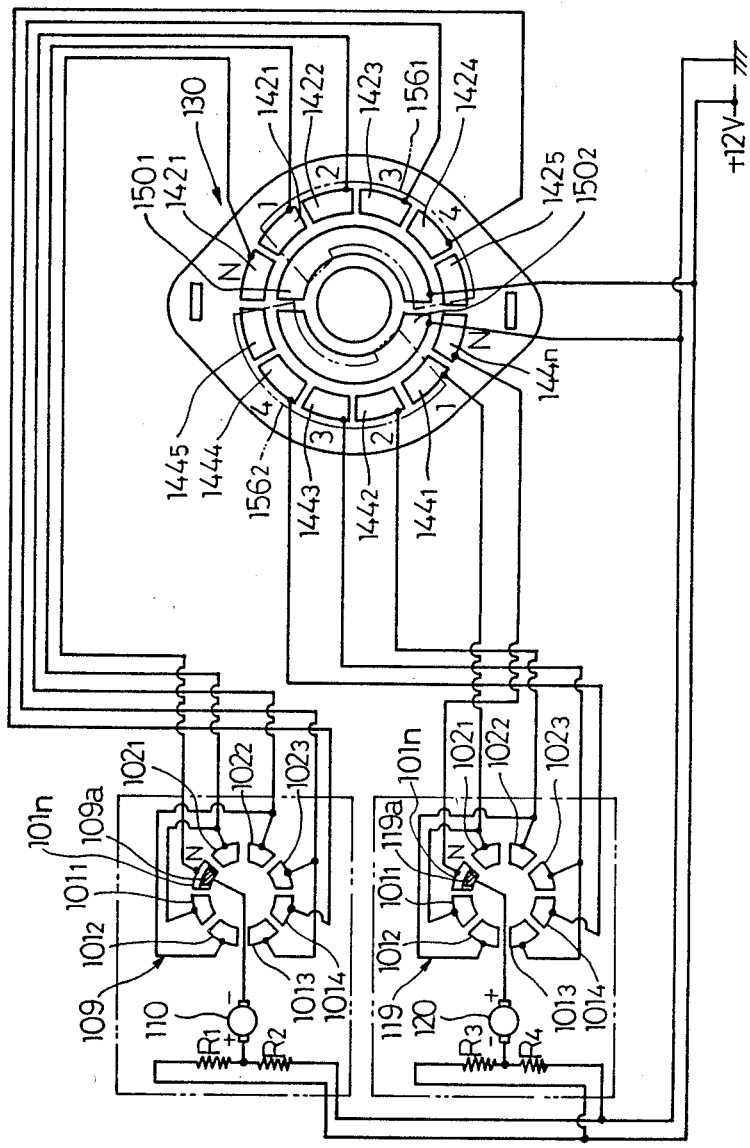
FIG. 18 is a circuit diagram of an electrical circuit used in the second embodiment of the invention.

A second embodiment is generally shown in FIG. 18, and includes a second rotary switch 130 which issues a tilt angle command for the headlamp and which is illustrated in FIGS. 12 and 13. Referring to FIGS. 12 and 13, the rotary switch 130 includes an insulated substrate 140 on which first fixed contactors including a first set 142$_n$, 142$_1$ to 142$_5$ and a second set 144$_n$, 144$_1$ to 144$_5$ as well as second fixed contactors including a first set 150$_1$ and a second set 150$_2$ are disposed. The first set of first fixed contactors 142$_n$, 142$_1$ to 142$_5$ and the first set of second fixed contactors 150$_1$ are integrally formed with terminals 151$_n$, 151$_1$ to 151$_5$ which extend through the substrate 140 to the opposite side thereof. Similarly, the second set of first fixed contactors 144$_n$, 144$_1$ to 144$_5$ and the second set of second fixed contactor 150$_2$ are also integrally formed with terminals (not shown) which extend through the substrate 140 to the opposite side thereof.

Figure 14:
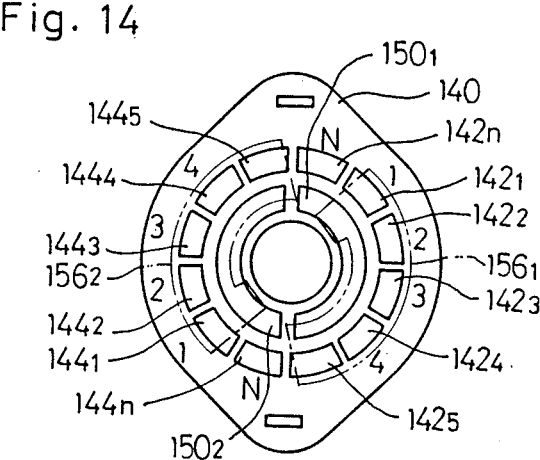
FIG. 14 is a plan view of a printed circuit board of the second rotary switch.

FIG. 14 specifically shows the disposition of the first and the second fixed contactors. A housing 158 is disposed in opposing relationship with the substrate 140, and fixedly carries a first contact member 156$_1$ and a second contact member 156$_2$, both formed of a conductive material. The first contact member 156$_1$ is formed with a first set of first selectors 153$_n$, 153$_1$ to 153$_4$ and a first set of second selector 155$_1$ while the second contact member 156$_2$ is formed with a second set of first selectors 154$_n$, 154$_1$ to 154$_4$ and a second set of second selector 155$_2$. These selectors are integral with and contiguous with the contact members, and hence the selectors formed on the common contact member are electrically connected to each other.

The contact members 156$_1$ and 156$_2$ have mounting holes 157 which are fitted over projections 158$a$ on the housing 158 to be secured thereto. A rotary shaft 159 has a projection 159$a$ which is received in a mounting hole 160$a$ of a rotary plate 160, and the plate 160 is secured thereto by caulking a flange 159$b$ of the shaft 159. The projection 159$a$ of the rotary shaft 159 is also passed through a mounting hole 158$b$ of the housing 158 so as to permit an integral rotation of the rotary shaft 159, rotary plate 160 and the housing 158. The rotary shaft 159 is slidably fitted into a cylindrical portion 161$a$ of a guide member 161, which is secured to the substrate 140. The guide member 161 is formed with a number of projections 161$b$ which are equal in number to the number of contactors 142$_1$, 142$_1$ to 142$_5$ and 144$_n$, 144$_1$ to 144$_5$ or twelve. The rotary plate 160 is provided with a projection 160$b$, which is adapted to be fitted between two adjacent projections 161$b$. The rotary plate 160 is formed on a resilient material so that the projection 160$b$ can move past the projection 161$b$ as the rotary shaft 159 rotates. In this manner, the rotary plate 160 undergoes an incremental rotation as the rotary shaft 159 is turned. The rotary plate 160 is also formed with projections 160$c$, 160$d$ which may be engaged with a projection 161$c$ on the guide member 161 to limit the extent of rotation. The guide member 161 also has a projection 161$d$ which is utilized to prevent the switch 130 from rotating when the rotary switch 130 is in use. A knob 162 is secured to the rotary shaft 159.

Figure 15:
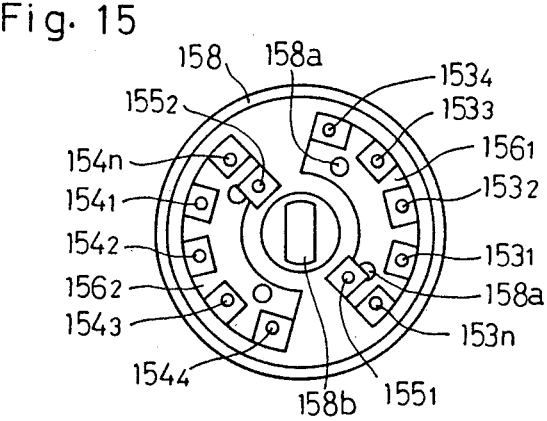
FIG. 15 is a plan view of a housing for the second rotary switch, as viewed into the housing.

FIG. 14 shows the substrate 140 and the contactors 142$_n$, 142$_1$ to 142$_5$, 144$_N$, 144$_1$ to 144$_5$, 150$_1$ and 150$_2$ in top view, and FIG. 15 shows the housing 158 and the contact members 156$_1$ and 156$_2$, the selectors 153$_n$, 153$_1$ to 153$_4$, 154$_n$, 154$_1$ to 154$_4$, 155$_1$ and 155$_2$ in bottom view. The substrate, the contactors, the selectors and the contact members of the rotary switch 130 are related to each other as indicated in Table below.

| Disposed on substrate 140 are: | First fixed contactors: 1st set 142$_n$, 142$_1$ to 142$_5$<br>First fixed contactors: 2nd set 144$_n$, 144$_1$ to 144$_5$<br>Second fixed contactors: 1st set 150$_1$<br>Second fixed contactors: 2nd set 150$_2$ | All contactors are insulated from each other and have respective terminals |
| Integrally formed with first contact 156$_1$ are: | First selectors: 1st set 153$_n$, 153$_n$ to 153$_4$<br>Second selectors: 1st set 155$_1$ | All electrically connected together |
| Integrally formed with second contact | First selectors: 2nd set 154$_n$, 154$_1$ to 154$_4$<br>Second selectors: 2nd set 155$_2$ | All electrically connected together |

| -continued |
|---|
| member 156$_2$ are: |

The operation of the rotary switch 130 will now be described. FIG. 14 shows a condition in which the first and the second set of second fixed contactors 150$_1$ and 150$_2$ engage the first and the second set of second selectors 155$_1$ and 155$_2$, respectively, and the first and the second set of first fixed contactors 142$_1$ to 142$_5$ and 144$_1$ to 144$_5$ engage the first and the second set of first selectors 153$_n$, 153$_1$ to 153$_4$ and 154$_n$, 154$_1$ to 154$_4$, respectively. Consequently, the first and the second set of second selectors 155$_1$ and 155$_2$ are electrically conductive with the first and the second set of first fixed contactors 142$_1$ to 142$_5$ and 144$_1$ to 144$_5$, respectively, while the circuit between one of the first set of first fixed contactors, 142$_n$, and one of the second set of first fixed contactors, 144$_n$, is interrupted. When the rotary shaft 159 rotates under this condition and the first and the second contact member 156$_1$ and 156$_2$ rotate through one step clockwise, the first and the second set of second selectors 155$_1$ and 155$_2$ are maintained in engagement with the first and the second set of second fixed contactors 150$_1$ and 150$_2$ while the first and the second set of first selectors 153$_n$, 153$_1$ to 153$_4$ and 154$_n$, 154$_1$ to 154$_4$ engage the contactors 142$_2$ to 142$_5$, 142$_n$ and 144$_2$ to 144$_5$, 144$_n$, respectively. Thus, the first and the second set of first selectors 153$_n$, 153$_1$ to 153$_4$ and 154$_n$, 154$_1$ to 154$_4$ engage first fixed contactors which are displaced by one clockwise. As a consequence, those contactors which have their circuit connection with the first and the second set of second fixed contactors 150$_1$ and 150$_2$ interrupted change from 142$_n$, 144$_n$ to 142$_1$, 144$_1$.

Figure 16:
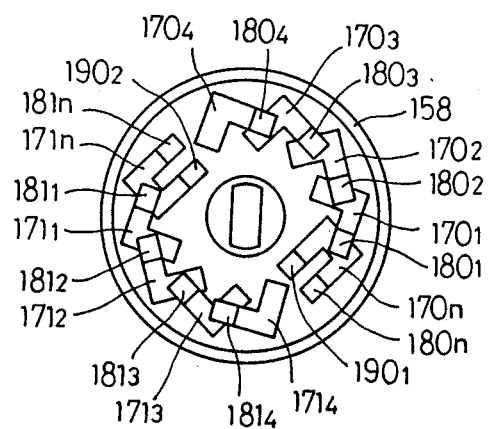
FIG. 16 is a plan view of a modification of the housing, when looking into the interior.
Figure 17:
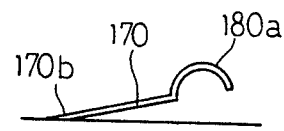
FIG. 17 is an enlarged side elevation of a selector used in the modification of FIG. 16.

FIG. 16 shows a modification of rotary switch 138 including a housing 158, specifically illustrating the inside thereof. It should be noted that FIG. 16 is an illustration which corresponds to FIG. 15. In this modification, the rotary switch includes a first set of first selectors 180$_n$, 180$_1$ to 180$_4$, a first set of second selector 190$_1$, a second set of first selectors 181$_n$, 181$_1$ to 181$_4$ and a second set of second selector 190$_2$. Contact members 170$_n$, 170$_1$ to 170$_4$ are separate from each other and are formed of a metal sheet having a resilience with their free end 180$a$ being formed as a second selector, as shown in FIG. 17. The contact member has an end 170$b$ which is embedded in the housing 158. Contact members 170$_n$ and 171$_n$ have configurations which are different from the configurations of the remaining contact members 170$_1$ to 170$_4$ and 171$_1$ to 171$_4$, and carry second selectors 190$_1$ and 190$_2$. Contact members 170$_n$, 170$_1$ to 170$_4$ are electrically connected to each other as a result of the engagement between adjacent contact members when their free ends (selectors) abut against the substrate 140. Similarly, the contact members 171$_n$, 171$_1$ to 171$_4$ are electrically connected to each other.

FIG. 18 shows a second embodiment of the invention. A motor 110 corresponds to the motor 40 shown in FIG. 1 and acts to drive the right headlamp 31. One end of the motor 40 is connected to a power supply through resistors R1 and R2 while the other end is connected to a selector 109$a$ of a rotary switch 109 which corresponds to the angle of rotation sensor 38 shown in FIG. 1. The switch 109 includes eight fixed contactors 101$_n$, 101$_1$ to 101$_4$ and 102$_1$ to 102$_3$ and a single selector 109$a$. The contactors of the angle of rotation sensor 109 are connected to the first set of first fixed contactors of the rotary switch 130. Specifically, the contactor 101$_n$ is connected to the contactor 142$_n$ of the rotary switch 130; contactors 101$_1$ and 102$_1$ are connected in common and connected to the contactor 142$_1$ of the rotary switch 130; contactors 101$_2$ and 102$_2$ are connected in common and connected to the contactor 142$_2$ of the rotary switch 130; contactors 101$_3$ and 102$_3$ are connected in common and connected to the contactor 142$_3$ of the rotary switch 130; and contactor 101$_4$ is connected to the contactor 142$_4$ of the rotary switch 130. In the angle of rotation sensor 109, note that contactors which are symmetrically disposed with respect to a line joining the contactors 101$_n$ and 101$_4$ are connected in common and that the contactors 101$_n$, 101$_1$ to 101$_4$ are less by one in number, than the number of the first set of first fixed contactors 142$_n$, 142$_1$ to 142$_5$ of the rotary switch 130 and corresponds in number to the first set of first selectors 153$_n$, 130$_1$ to 130$_4$ and are connected to contactors 142$_n$, 142$_1$ to 142$_4$, respectively.

An electric motor 120 is provided to drive the left headlamp, and is similarly connected to resistors R3, R4 and a rotary switch 119, the contactors of which are connected to the second fixed contactors of the rotary switch 130. The second fixed contactors 150$_1$ and 150$_2$ of the rotary switch 130 are connected to the power supply for the motor.

The rotary switch 130 has six first fixed contactors 142$_n$, 142$_1$ to 142$_5$ in the first set and contactors 144$_n$, 144$_1$ to 144$_5$ in the second set so as to allow six levels to be selected for the angle of inclination. By contrast, the second embodiment shown in FIG. 8 is designed to allow five levels to be selected for the angle of inclination. For this reason, the fixed contactors 142$_5$ and 144$_5$ of the rotary switch 130 are not connected to the angle of rotation sensors 109, 119. In other words, the fixed contactors 142$_5$ and 144$_5$ of the rotary switch 130 are not used in the second embodiment.

The operation of the second embodiment shown in FIG. 18 will now be described. When the manual knob 162 of the rotary switch 130 is located at its N position to establish both the left and the right headlamp at their N position, the selectors 109$a$ and 119$a$ of the angle of rotation sensors 109 and 119 engage the contactors 101$_n$ and 119$_n$, respectively. Under this condition, the selectors on the contact members 156$_1$ and 156$_2$ of the switch 130 do not engage the contactors 142$_n$ and 144$_n$, so that a voltage of +12 V is applied to the resistors R1 and R3 which are connected to the forward rotation terminals of the motors 110 and 120 and the ground potential is applied to the resistors R2 and R4 which are connected to the reverse rotation terminals while the selectors 109$a$ and 119$a$ which are connected to the common terminals of the motors 110 and 120 are out of connection, so that the motors 110 and 120 are not energized and hence remain at rest. When the knob 62 is turned clockwise one step, the contact member 156$_1$ of the switch 130 engages the contactor 142$_n$ and the contact member 156$_2$ engages the contactor 144$_n$. In the angle of rotation sensor 109, the selector 109$a$ engages the contactor 101$_n$, and hence the selector 109$a$ is connected to the ground to energize the motor 110 for forward rotation. As a result, the selector 109$a$ of the sensor 109 rotates clockwise, moving into engagement with the contactor 102$_1$. In the switch 130, the selector of the contact member 156$_1$ of the switch 130 is removed from the contactor 142$_1$, and hence the contactor 102$_1$ is out of connection, and the motor 110 continues its forward rotation as long as the selector 109$a$ engages the both contactors $101_n$ and $102_1$. When the selector $109a$ moves away from the contactor $101_n$, the selector $109a$ becomes disconnected, whereby the motor 110 is deenergized and comes to a stop. Similarly, the motor 120 rotates in the forward rotation and comes to a stop when the selector $119a$ on the sensor 119 moves away from the contactor $101_n$.

In the similar manner, each time the knob of the switch 130 is turned one step clockwise, the motors 110 and 120 are energized for forward rotation as long as the selectors $109a$ and $119a$ rotate clockwise for a stroke corresponding to one step.

Conversely, when the knob 162 of the switch 130 assumes its "3" position, where the contact member $156_2$ has its selector connected to the contactors $142_2$, $142_1$, $142_n$, $144_5$ and $144_4$ and the contact member $156_1$ engages the contactors $142_4$, $142_5$, $144_n$, $144_2$ and wherein the selectors $109a$ and $119a$ on the sensors 109 and 119 engage the contactor $102_3$, turning the knob 162 of the switch 130 one step counter-clockwise results in causing the contact member $156_2$ to engage the contactors $142_1$, $142_n$, $144_5$, $144_4$ and $144_3$ and causing the contact member $156_1$ to engage the contactors $142_3$, $142_4$, $142_5$, $144_n$ and $144_1$. Thereupon, the selector $109a$ is connected to the supply of +12 V through the contact member $156_1$ to apply +12 V to the common terminal of the motor 110, causing a current flow through a path including the motor 110 and the resistor R2 to energize the motor 110 for reverse rotation. This rotates the selector $109a$ counterclockwise. When the selector $109a$ moves away from the contactor $102_3$, the motor 110 is deenergized and comes to a stop since the contactor $102_2$ is electrically disconnected. The selector $119a$ is connected to the ground through the contact member $156_2$, causing the motor 120 to rotate reversely, thus rotating the selector $119a$ counter-clockwise. When the selector $119a$ moves away from the contactor $102_3$, the motor 120 is deenergized and stops since the contactor $102_2$ is electrically disconnected.

It will be seen that in the described operation, the contactors $101_1$ to $101_3$ of the angle of rotation sensors 109 and 119 have no purpose in controlling the energization of the motors. However, if the resistor R1 is connected to the ground potential and the resistor R2 is connected to the supply of +12 V, the motor 110 will rotate in the direction which is opposite from that described above. The purpose of disposing two sets of contactors disposed symmetrically between those contactors which correspond to the maximum angle (4) and the minimum angle (N) and allowing the selector $109a$ to be rotatable either in the same direction as or in the opposite direction from the direction of rotation of the motor 110 in the angle of rotation sensor 109 is to accommodate for any demage or inability to operate which may result from wrong connections of the headlamp drive mechanism, the angle of rotation sensor and the rotary switch during their assembly, and to allow a choice of the direction of rotation of the switch 130 in relation to an increase or decrease in the angle of inclination.

It will be noted in the second embodiment shown in FIG. 18, the supply of +12 V is divided to one-hald its value by a voltage divider formed by the resistors R1 and R2 to apply +6 V to one end of the motor 110, the other end of which may be either at the ground potential or +12 V. In this manner, 6 V of opposite polarities are applied across the terminals of the motor 110 for forward and reverse rotation. This arrangement is chosen because +12 V supply is readily available and a voltage divider formed by the resistors R1 and R2 can be inexpensively constructed to permit a small motor of an inexpensive construction to be used.

It will be noted that the rotary switch used in the second embodiment has a reduced number of contacts and has a simple construction, thus resulting in an improved durability and a reduced cost. A single rotary switch may be used to instruct a desired angle of inclination for a plurality of headlamps such as the left and right headlamps.

What is claimed is:

1. A headlamp drive and control apparatus comprising
   a headlamp drive mechanism including an electric motor for supporting a headlamp and driving it for tilting movement;
   a support member carrying the headlamp drive mechanism;
   an angle of rotation sensor coupled to the headlamp drive mechanism for detecting a tilt angle of the headlamp;
   an inclinometer for detecting an angle of inclination of the support member with respect to a horizontal plane;
   projection angle control means for comparing a tilt angle signal from the angle of rotation sensor and an angle of inclination signal from the inclinometer and for developing a motor energization control signal in accordance with the result of comparison;
   a motor driver responsive to the motor energization control signal to energize or deenergize the electric motor; and
   time limit means initiating its timing operation as the energization of the motor is initiated and terminating the timing operation as the motor is deenergized, the time limit means developing a motor stop signal to be applied to the motor driver whenever it has timed out.

2. A headlamp drive and control apparatus comprising
   a headlamp drive mechanism including an electric motor for supporting a headlamp and driving it for tilting movement;
   a support member carrying the headlamp drive mechanism;
   an angle of rotation sensor coupled to the headlamp drive mechanism for detecting a tilt angle of the headlamp;
   an inclinometer for detecting an angle of inclination of the support member with respect to a horizontal plane;
   projection angle control means for comparing a tilt angle signal from the angle of rotation sensor and an angle of inclination signal from the inclinometer and for developing a motor energization control signal in accordance with the result of comparison; and
   a motor driver responsive to the motor energization control signal to energize or deenergize the electric motor;
   said inclinometer comprises a base mount, a pipe-shaped member having a curved configuration, a tiltable solid element disposed within the pipe-shaped member and movable along the curvature of the pipe-shaped member under gravity, support means mounted on the base mount for carrying the pipe-shaped member, and a solid element detector including a plurality of detecting elements disposed alongside the pipe-shaped member and functioning to detect the presence or absence of the tiltable solid element.

3. A headlamp drive and control apparatus according to claim 2 in which the projection angle control means is formed by an analog processing circuit including a D/A converter for converting the angle of inclination signal, which comprise status signals from the detecting elements of the inclinometer, into a corresponding analog signal, and a comparison circuit for comparing the analog signal against the tilt angle signal to develop a motor energization control signal.

4. A headlamp drive and control apparatus according to claim 3 in which the D/A converter comprises a first D/A converter section for converting an angle of inclination signal defined by status signals from the detecting elements of the inclinometer, into an analog signal, and a second D/A converter section for developing another analog signal which is one step lower in voltage than the analog signal from the first converter section in response to the same angle of inclination signal, and in which the comparison circuit comprises a first comparator for comparing the analog signal from the first converter section against the tilt angle signal, and a second comparator for comparing the analog signal from the second converter section against the tilt angle signal.

5. A headlamp drive and control apparatus according to claim 2 in which the pipe-shaped member comprises a light transmitting tube and the tiltable solid element is formed by a light intercepting ball, and in which the solid element detector comprises a light source extending along the light transmitting tube and a plurality of photoelectric transducer elements disposed on the opposite side of the tube from the light source in opposing relationship with the latter, thus defining a photosensor.

6. A headlamp drive and control apparatus according to claim 2 in which the support means includes an orifice which suppresses a flow of a fluid into or out of the pipe-shaped member.

7. A headlamp drive and control apparatus according to claim 6 in which the support means includes a throttle adjusting screw which adjusts the flow of the fluid into or out of the pipe-shaped member through the orifice.

8. A headlamp drive and control apparatus comprising
a headlamp drive mechanism including an electric motor for supporting a headlamp and driving it for tilting movement;
a support member for supporting the headlamp drive mechanism;
an angle of rotation sensor including a patterned conductor member having a conductor formed in a given pattern on the surface of an insulating sheet, and an insulated substrate having a plurality of contactors secured thereon for contact with selected areas of the conductor, the patterned conductor member and the insulated substrate being disposed in opposing relationship with each other, one of the patterned conductor member and the insulated substrate being fixedly mounted on a rotary shaft so that the sensor is coupled to the headlamp drive mechanism to detect a tilt angle of the headlamp, the pattern including and defining a plurality of conductors which are separate from each other and each of which includes an arcuate portion extending circumferentially about the rotary shaft and a radial portion which is contiguous with the corresponding arcuate portion and extending radially of the rotary shaft, the radial portions of the individual conductors being disposed adjacent to each other, the contactors being grouped into a first set of contactors which are adapted to engage the arcuate portions of the individual conductors and a second set of contactors which are adapted to engage the radial portions of the individual conductors successively as the rotary shaft rotates;
an angle command generator for providing a desired tilt angle for the headlamp;
projection angle control means for comparing a signal from the angle of rotation sensor against a signal from the angle command generator to develop a motor energization control signal in accordance with the relationship between the both signals; and
a motor driver for energizing or deenergizing the electric motor in accordance with the motor energization control signal.

9. A headlmap drive and control apparatus according to claim 8 in which eacn of the radial portions includes radially outward section which extends in one direction circumferentially and a radially inward section which extends in the opposite direction circumferentially, thus exhibiting a staggered configuration, the second set including two contactors, one of which engages the radially outward section of the radial portion of a particular conductor and the other of which simultaneously engages the radially inward section of the radial portion of another conductor.

10. A headlamp drive and control apparatus according to claim 8, further comprising an up/down command switch, and in which the angle of rotation sensor further includes another arcuate up/down switching conductor, a common contactor maintained in engagement with the switching conductor, an up command contactor which is maintained out of engagement with the switching conductor when the headlamp assumes a tilt angle within a control range and which is adapted to engage the switching conductor when the angle of the headlamp is outside the control range, and a down command contactor which is maintained out of contact with the switching conductor when the headlamp assumes its stowed position and which is adapted to engage the switching conductor when the headlamp assumes other positions, the up/down command switch including an up contact connected to the up command contactor, and a down contact connected to the down command contactor, the common contactor being connected to a terminal of the motor driver which allows the energization of the motor.

11. A headlamp drive and control apparatus according to claim 8, further comprising time limit means initiating its timing operation as the energization of the motor is initiated and terminating its timing operation when the motor is deenergized, the time limit means developing a motor stop signal when it has timed out.

12. A headlamp drive and control apparatus according to claim 8 in which the angle command generator comprises an inclinometer which detects an angle of inclination of the support member with respect to a horizontal plane.

13. A headlamp drive and control apparatus comprising a headlamp drive mechanism including an electric motor for supporting a headlamp and for driving it for tilting movement;

headlamp drive and control means for developing a motor energization control signal;

a motor driver for selectively energizing or deenergizing the electric motor in accordance with the motor energization control signal and for terminating the energization motor in response to a motor stop signal; and time limit means initiating its timing operation when the energization of the motor is initiated and terminating its timing operation when the motor is deenergized, the time limit means developing a motor stop signal when the motor continues to be energized for a given time interval since the initiation of the energization of the motor.

14. A headlamp drive and control apparatus according to claim 13 in which the motor driver includes a relay which may be energized to enable the energization of the motor, and in which the time limit means is formed by a timer circuit which comprises a timing operation control switching means which is changed from one of its on/off conditions to the other condition as the relay begins to be energized and for maintaining the other condition as long as the relay remains energized, an RC time constant circuit constructed in a manner such that its charging and discharging operation is controlled by the on/off condition of the switching means, comparison means for comparing the charged voltage of the time constant circuit against a reference value and providing an inverted output to deliver a motor stop signal to the motor driver as the charged voltage crosses the reference value, and self-/holding switching means responsive to the motor stop signal by changing its status to apply a signal to the comparison means which enables it to maintain the motor stop signal.

15. A headlamp drive and control apparatus according to claim 14 in which the timing operation control switching means causes the RC time constant circuit to be charged in response to the energization of the relay and causes the time constant circuit to be discharged as the energization of the relay is interrupted, and in which the self-holding switching means reverts to a condition in which the self-holding signal is interrupted whenever the power is turned off.

16. A headlamp drive and control apparatus comprising a headlamp drive mechanism including an electric motor and for supporting a headlamp, for driving the headlamp between its stowed position and extended position and for controlling the projection angle of the headlamp when it is in its extended position;

an angle of rotation sensor coupled to the headlamp drive mechanism for detecting a tilt angle of the headlamp;

an angle command generator for delivering a desired tilt angle of the headlamp;

projection angle control means for comparing an electric signal from the angle of rotation sensor against an electric signal from the angle command generator to develop a motor energization control signal in accordance with the result of comparison;

retract switch means for causing the electric motor to be energized in its high torque mode so that the headlamp may be driven to its stowed position or extended position; and a motor driver including switching means which changes the energization of the motor between a low torque mode and a high torque mode, the motor driver thus being capable of selectively energizing the electric motor in its low torque mode, high torque mode or to stop it in accordance with a combination of the motor energization control signal and a high torque signal.

17. A headlamp drive and control apparatus according to claim 16 in which the motor driver comprises a first relay which allows the motor to be energized for forward rotation, a second relay which allows the motor to be energized for reverse rotation, a high torque/low torque switching relay, and an electrical circuit for energizing or deenergizing the relays in accordance with a command from the retract switch means and the motor energization control signal.

18. A headlamp drive and control apparatus according to claim 17, further comprising time limit means initiating its timing operation as the energization of the motor is initiated and terminating its timing operation when the motor is deenergized, the time limit means developing a high torque signal whenever the motor continues to be energized for a first time interval from the initiation of the energization of the motor, the time limit means developing a motor stop signal when the motor continues to be energized for a second given time interval since the high torque signal is developed, the motor driver being responsive to the motor stop signal to deenergize the motor.

19. A headlamp drive and control apparatus according to claim 17 in which the angle command generator comprises an inclinometer which detects an angle of inclinnation of the support member with respect to a horizontal plane.

20. A headlamp drive and control apparatus according to claim 16 in which the angle of rotation sensor comprises a patterned conductor member having a given pattern of conductors formed on the surface of an insulating sheet, and an insulated substrate having a plurality of contactors secured thereto for engagement with selected areas of the conductors, the patterned conductor member and the insulated substrate being disposed in opposing relationship with each other and one of them being fixedly mounted on a rotary shaft to which the headlamp drive mechanism is coupled, thus detecting a tilt angle of the headlamp, said pattern defining a plurality of conductors which are separate from each other, each of the plurality of conductors including an arcuate portion extending circumferentially around the axis of the rotary shaft and a radial portion extending radially of the rotary shaft, the radial portions of the individual conductors being disposed adjacent to each other, the contactors being grouped into a first set of contactors which are adapted to engage the arcuate portions of the individual conductors and a second set of contactors which are adapted to engage the radial portions successively as the rotary shaft rotates.

21. A headlamp drive and control apparatus according to claim 20 in which each of the radial portions includes a radially outward section which extends in one direction circumferentially and a radially inward section which extends in the opposite direction circumferentially, thereby defining a staggered configuration, the second set including two contactors, one of which engages the radially outward section of the radial portion of a particular conductor and the other of which simultaneously engages the radially inward section of the radial portion of another conductor.

22. A headlamp drive and control apparatus according to claim 20 in which the angle of rotation sensor further includes another arcuate up/down switching conductor, a common contactor maintained in contact with the switching conductor, an up command contactor which is maintained out of contact with the switching conductor when the headlamp assumes an angle within a control range and which is adapted to engage with the switching conductor when the headlamp assumes an angle outside the control range, and a down command contactor which is maintained out of contact with the switching conductor when the headlamp is in its stowed position and which is adapted to engage the switching conductor when the headlamp assumes other positions, the retract switch means including an up contact connected to the up command contactor, and a down contact connected to the down command contactor, the common contactor being connected to terminals of the motor driver which enable the energization of the motor and which command the energization of the motor in its high torque mode.

23. A headlamp drive and control apparatus comprising
    a headlamp drive mechanism including an electric motor and for supporting a headlamp and driving it for tilting movement;
    a first rotary switch coupled to the headlamp drive mechanism for movement together with the tilting movement of the headlamp;
    a second rotary switch for delivering a command tilt angle for the headlamp and including a plurality of first fixed contactors disposed on a substrate, a plurality of second fixed contactors disposed on the substrate, a plurality of first selectors which are less in number than the number of the first fixed contactors and which can be brought into engagement with the first fixed contactors, and a plurality of second selectors which can be brought into engagement with the second fixed contactors, the first selectors being divided into a plurality of sets, each of which is connected to one of the second selectors, the substrate and one of the first and the second selector being fixedly mounted on a rotary shaft; and
    an electrical circuit for connecting the electric motor to a power supply through the first and the second rotary switch.

24. A headlamp drive and control apparatus according to claim 23 in which the second rotary switch delivers angle commands which are equal to a in number which is in turn equal to the number of the first fixed contactors while the first selectors are equal to (a−1) in number, each of the first selectors being adapted to engage any one of a first fixed contactors.

25. A headlamp drive and control apparatus according to claim 24 in which the second fixed contactors are equal to n in number, the first fixed contactors are equal to (n×a) in number, the second selectors are equal to n in number and the first selectors are equal to n(a−1) in number, the rotation of the first and second selectors relative to the first and second fixed contactors achieving a simultaneous switching of n circuits.

26. A headlamp drive and control apparatus according to claim 24 in which the first rotary switch includes 2+2(a−2) contactors disposed on a common circumference on a substrate, and a single selector disposed in opposing relationship with the substrate and adapted to engage the contactors, the contactors except for two diametrically opposite contactors being disposed symmetrically with respect to the diametrical line joining said two contactors, and symmetrical ones of these contactors being connected in common, a successive contactors of the first rotary switch being electrically connected to the first fixed contactors of the second rotary switch, the electric motor of the headlamp drive mechanism having its one end connected to the selector on the first rotary switch while the second fixed contactors of the second rotary switch are connected to a power supply.

27. A headlamp drive and control apparatus according to claim 25 in which n first rotary switches are provided, each of which includes 2+2(a−2) contactors disposed on a common circumference on a substrate and a single selector disposed in opposing relationship with the substrate and adapted to engage the contactors, the contactors except for two diametrically opposite contactors being disposed symmetrically with respect to the diametrical line which join said two contactors, symmetrical ones of these contactors being connected in common, a successive contactors of a first one of the n rotary switches being electrically connected to a first fixed contactors of the second rotary switch, the electric motor of the headlamp drive mechanism having its one end connected to the selector of each of the first rotary switches while the second fixed contactors of the second rotary switch are connected to a power supply.

28. A headlamp drive and control apparatus according to claim 27 in which said n is equal to 2, and in which the other end of the electric motor is connected to the ends of a resistive voltage divider connected across a power supply, one of the second fixed contactors of the second rotary switch being connected to the positive terminal of the power supply and another of the second fixed contactors is connected to the negative terminal of the power supply.

* * * * *